(12) United States Patent
Maeda

(10) Patent No.: US 6,625,009 B2
(45) Date of Patent: Sep. 23, 2003

(54) SOLID ELECTROLYTIC CAPACITOR AND METHOD OF MAKING THE SAME

(75) Inventor: Masahide Maeda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/116,055

(22) Filed: Apr. 5, 2002

(65) Prior Publication Data

US 2002/0163775 A1 Nov. 7, 2002

(30) Foreign Application Priority Data

Apr. 5, 2001 (JP) ........................................ 2001-107566

(51) Int. Cl.7 .............................. H01G 9/04; H01G 9/145
(52) U.S. Cl. ........................ 361/528; 361/532; 361/538
(58) Field of Search ..................................... 361/523–541

(56) References Cited

U.S. PATENT DOCUMENTS 4,488,204 A  * 12/1984  Beck, Jr. .................... 361/540
5,608,602 A    3/1997  Kuriyama ................... 361/534
5,661,628 A    8/1997  Yamagami ................ 361/275.4
6,262,878 B1 *  7/2001  Shirashige et al. ......... 361/508
6,430,034 B2 *  8/2002  Sano et al. ................. 361/528

FOREIGN PATENT DOCUMENTS

JP          3-89509     *  4/1991     ............ H01G/9/08

* cited by examiner

*Primary Examiner*—Dean A. Reichard
*Assistant Examiner*—Eric Thomas
(74) *Attorney, Agent, or Firm*—Michael D. Bednarek; Shaw Pittman LLP

(57) ABSTRACT

A solid electrolytic capacitor includes a capacitor element having an element body and an anode wire extending therefrom, an anode lead electrically connected to the anode wire, a cathode lead electrically connected to the element body, and a resin package integrally sealing these parts. Each of the anode lead and the cathode lead is a conductive plate. The element body is connected to the upper surface of the cathode lead. The anode wire is connected to the upper surface of the anode lead via a conductive bolster.

12 Claims, 22 Drawing Sheets

SOLID ELECTROLYTIC CAPACITOR AND METHOD OF MAKING THE SAME

BACKGROUND OF THE INVENTION

1. Field of the Invention

The present invention relates to a solid electrolytic capacitor for mounting on a printed wiring board and a method of making the same.

2. Description of the Related Art

FIGS. 34 and 35 illustrate an example of prior art tantalum solid electrolytic capacitor (hereinafter simply referred to as "solid electrolytic capacitor"). The solid electrolytic capacitor 61 includes a cathode lead 62, an anode lead 63, a capacitor element C1 and a resin package 65 for partially sealing these elements. The capacitor element C1 includes an element body 64 and an anode wire 66 extending from an end surface 64a of the element body. The element body 64 is formed with a metal layer 67 for covering the outer surfaces thereof. The metal layer 67 is electrically connected to the cathode lead 62. The anode wire 66 is electrically connected to the anode lead 63.

A method for making the solid electrolytic capacitor 61 will be described. First, an element body 64 is connected, with a conductive adhesive 68, to a cathode lead 62 formed on a manufacture lead frame (not shown). Further, an anode wire 66 extending from the element body 64 is connected, by e.g. spot welding, to an anode lead 63 similarly formed on the manufacture lead frame. Thereafter, these parts are sealed by a resin package 65 formed of an epoxy resin for example. Subsequently, the leads 62, 63 extending outward from the resin package 65 are separated from the manufacture lead frame. Then, each lead 62, 63 is bent to have a desired configuration.

In bending each lead 62, 63 into a desired configuration, a considerable bending stress is exerted on the resin package 65. Therefore, the solid electrolytic capacitor 61 need be strong enough to withstand the bending stress. Generally, damages due to the bending stress are prevented by making the resin package 65 relatively thick. However, an increase in the thickness of the resin package 65 provides a large thickness at a portion other than the element body 64, which leads to an increase in the product size.

Recently, there is an increasing need for a solid electrolytic capacitor 61 of a high capacitance. Generally, to provide a solid electrolytic capacitor of a high capacitance, the size of the capacitor element itself need be increased. For this purpose, the size of the solid electrolytic capacitor accommodating the element need be increased.

However, the mounting density of a printed wiring board for mounting a solid electrolytic capacitor 61 becomes higher in accordance with the size reduction of electronic components. Therefore, a solid electrolytic capacitor 61 also need be reduced in size. Thus, it is not desirable to increase the size of the solid electrolytic capacitor to provide a higher capacitance.

Further, in the capacitor element C1, the anode wire 66 extending from the element body 64 is made of tantalum for example. Therefore, good conduction cannot be established between the anode wire 66 and the anode lead 63 made of e.g. copper because of the affinity between the materials.

SUMMARY OF THE INVENTION

It is, therefore, an object of the present invention to provide a solid electrolytic capacitor which is capable eliminating or at least reducing the problems described above.

According to a first aspect of the present invention, there is provided a solid electrolytic capacitor comprising a capacitor element including an element body and a conductive wire extending therefrom, a first electrode electrically connected to the element body, a second electrode electrically connected to the conductive wire, and a resin package integrally sealing said parts. Each of the first electrode and the second electrode comprises a conductive plate and has a lower surface exposed at a lower surface of the resin package for serving as a terminal surface. The first electrode has an upper surface to which the element body is connected, and the second electrode has an upper surface to which the conductive wire is connected via a conductive bolster.

Preferably, the lower surface of the first electrode is stepped, and the upper surface is larger in area than the terminal surface.

Preferably, the lower surface of the first electrode is partially etched to be stepped.

Preferably, the upper surface of the second electrode has an edge formed with a stepped portion.

Preferably, the stepped portion is formed by partially etching the upper surface of the second electrode.

Preferably, the conductive bolster is in the form of a rectangular parallelepiped, and at least one end surface of the conductive bolster is exposed at a side surface of the resin package.

Preferably, the conductive wire is formed of tantalum, whereas the conductive bolster is formed of nickel or an alloy containing nickel. The two members are connected to each other by resistance welding.

Preferably, the element body is connected to the upper surface of the first electrode with a conductive adhesive, and the conductive bolster is connected to the upper surface of the second electrode with a conductive adhesive.

According to a second aspect of the present invention, there is provided a method of making a solid electrolytic capacitor which comprises a capacitor element including an element body and a conductive wire extending therefrom, and a resin package for sealing the capacitor element. The method comprises preparing a plate-like fabrication frame including a plurality of unit regions arranged in a matrix. Each of the unit regions includes a first electrode and a second electrode having respective inner ends spaced from each other by a predetermined distance. An element body of a capacitor element is connected to an upper surface of each of the first electrodes, whereas a conductive wire extending from the element body is connected to an upper surface of a corresponding one of the second electrodes via a conductive bolster. An intermediate article is provided by resin-sealing the fabrication frame to enclose the capacitor elements while exposing the lower surfaces of the first electrodes and the second electrodes. The intermediate article is divided into each of the unit regions.

Preferably, the conductive bolster is connected to the conductive wire by resistance welding. The element body is connected to the upper surface of the first electrode with a conductive adhesive, whereas the conductive bolster is connected to the upper surface of the second electrode with a conductive adhesive.

According to a third aspect of the present invention, there is provided a solid electrolytic capacitor comprising a substrate having an upper surface formed with a first and a second electrodes and a lower surface formed with terminal surfaces electrically connected to the first and the second electrodes, respectively, a capacitor element including an element body and a conductive wire extending therefrom, and a resin package for sealing the capacitor element. The element body is connected to the first electrode of the substrate, and the conductive wire is connected to the second electrode of the substrate via a conductive bolster.

Preferably, the conductive bolster is in the form of a rectangular parallelepiped, and at least one end surface of the conductive bolster is exposed at a side surface of the resin package.

Preferably, the conductive wire is formed of tantalum, and the conductive bolster is formed of nickel or an alloy containing nickel. The two members may be connected to each other by resistance welding.

Preferably, the element body is connected to the upper surface of the first electrode with a conductive adhesive, whereas the conductive bolster is connected to the upper surface of the second electrode with a conductive adhesive.

According to a fourth aspect of the present invention, there is provided a method of making a solid electrolytic capacitor which comprises a capacitor element including an element body and a conductive wire extending therefrom, and a resin package for sealing the capacitor element. The method comprises preparing a material board including a plurality of unit regions arranged in a matrix. Each of the unit regions includes an upper surface formed with a first and a second electrodes having respective inner ends spaced from each other by a predetermined distance, and a reverse surface formed with terminal surfaces electrically connected to the first and the second electrodes, respectively. An element body of a capacitor element is connected to each of the first electrodes. A conductive wire extending from the element body is connected to a corresponding one of the second electrodes via a conductive bolster. An intermediate article is provided by resin-sealing the material board to enclose the capacitor elements while exposing the terminal surfaces. The intermediate article is divided into each of the unit regions.

Preferably, the conductive bolster is connected to the second electrode by resistance welding. The element body is connected to the first electrode with a conductive adhesive, whereas the conductive bolster is connected to the second electrode with a conductive adhesive.

Other features and advantages of the present invention will become clearer from the description of the preferred embodiment given below with reference to the accompanying drawings.

BEST MODE FOR CARRYING OUT THE INVENTION

Figure 1:
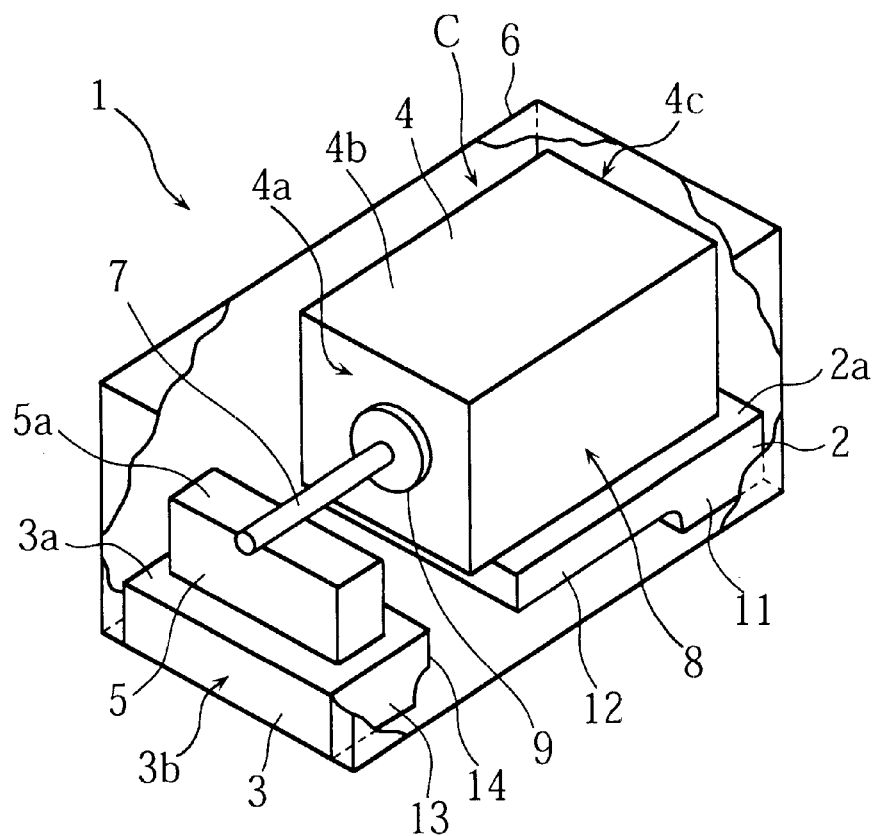
FIG. 1 is a perspective view, which is partially cut away, showing a solid electrolytic capacitor according to a first embodiment of the present invention.

Preferred embodiments of the present invention will be described below in detail with reference to the accompanying drawings. Throughout the drawings, the elements which are identical or similar are designated by the same reference signs.

First, description will be made with reference to FIGS. 1–4. These figures illustrate a tantalum solid electrolytic capacitor (hereinafter simply referred to as "solid electrolytic capacitor") according to a first embodiment of the present invention.

The solid electrolytic capacitor 1 includes a cathode lead 2 and an anode lead 3 which are appropriately spaced from each other, a capacitor element C connected to the cathode lead 2, a conductive bolster 5 connected to the anode lead 3, and a resin package 6 of a thermosetting resin such as an epoxy resin for sealing these elements.

Figure 2:
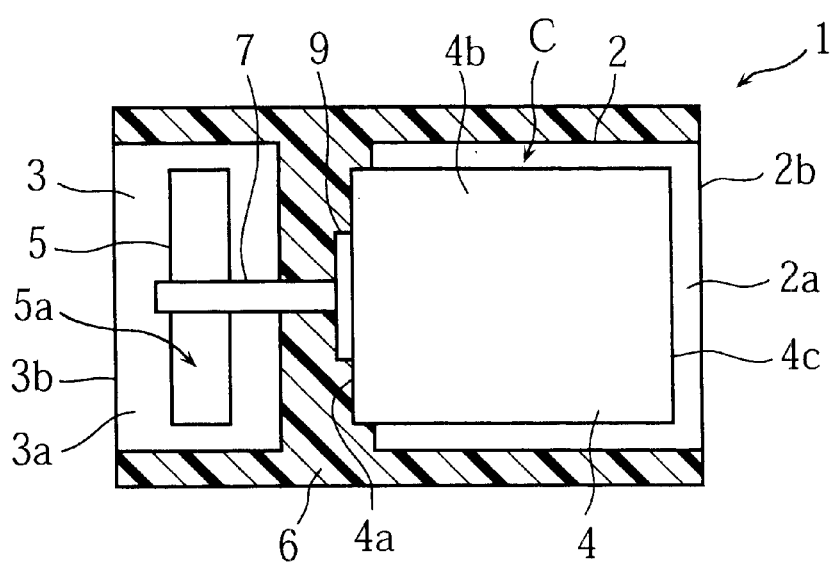
FIG. 2 is a see-through top view showing the solid electrolytic capacitor of FIG. 1.
Figure 3:
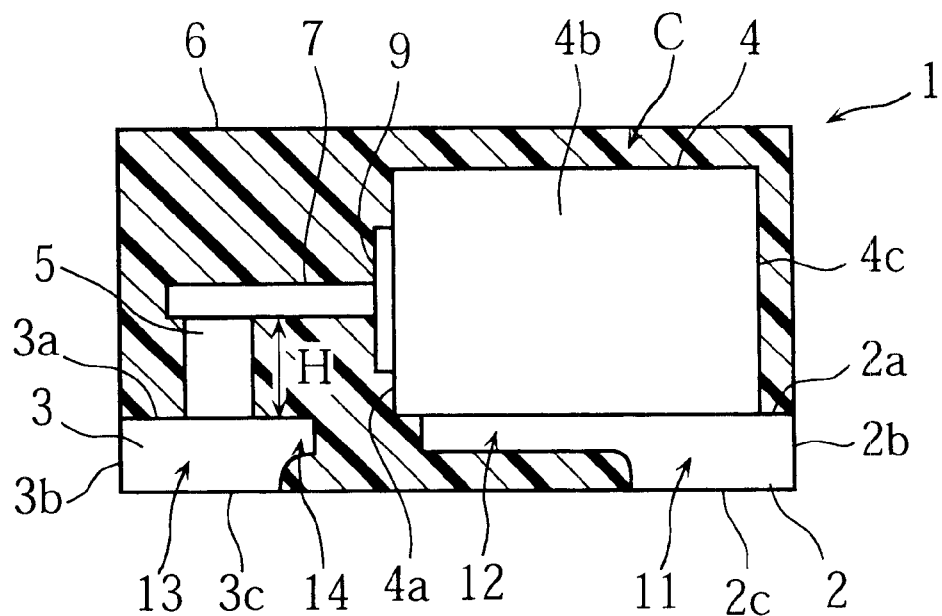
FIG. 3 is a see-through side view showing the solid electrolytic capacitor of FIG. 1.
Figure 4:
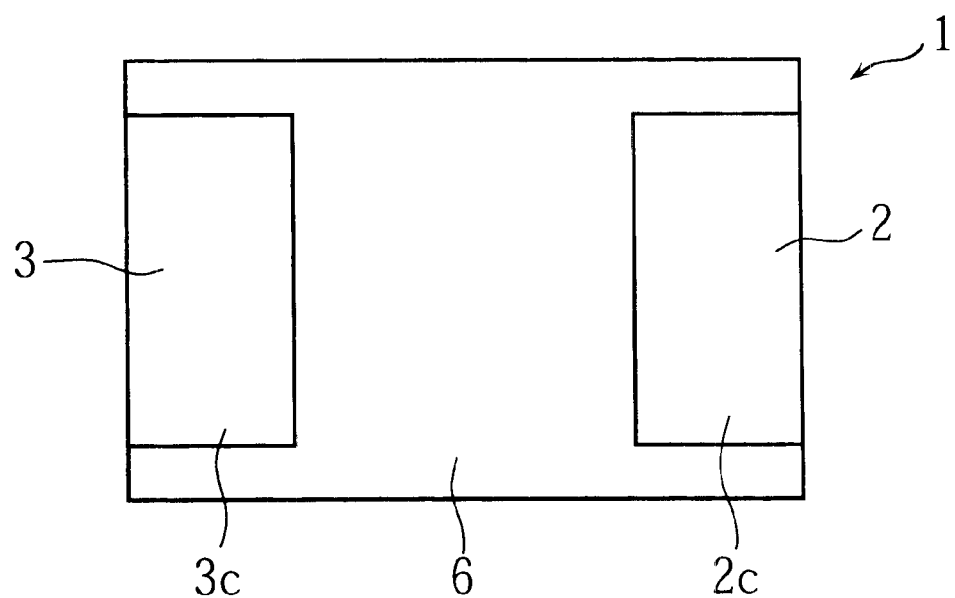
FIG. 4 is a bottom view showing the solid electrolytic capacitor of FIG. 1.

The capacitor element C has an element body 4 which is generally in the form of a rectangular parallelepiped. The element body 4 of the capacitor element 4 has one end surface 4a from which an anode wire 7 extends outward. As shown in FIG. 3, the element body 4 is made up of a porous sintered body 4A formed by sintering metal powder such as tantalum powder, the anode wire 7 having a base end embedded in the porous sintered body 4A, a surface oxide film 4B formed on the metal powder to serve as a dielectric layer, a semiconductor layer 4C and a graphite layer 4D formed around the outer surfaces of the porous sintered body 4A, and a metal layer 8 made of e.g. silver for covering the outer surfaces of the graphite layer 4D. The metal layer 8, which functions as a cathode, is formed on the side surfaces 4b and the other end surface 4c (See FIGS. 2 and 3). The element body 4 is connected to the upper surface 2a of the cathode lead 2 with a conductive adhesive for example. The porous sintered body 4A may be alternatively formed of aluminum or niobium for example.

The cathode lead 2 may comprise a conductive plate of copper for example. The cathode lead 2 has a stepped lower surface. Thus, the cathode lead 2 has a thicker-walled portion 11 having a predetermined thickness and a thinner-walled portion 12 which is thinner than the thicker-walled portion. The stepped lower surface of the cathode lead 2 may be formed by half-etching.

The lower surface 2c of the cathode lead 2 (See FIGS. 3 and 4) is exposed at the lower surface of the resin package 6 to serve as a terminal surface. The solid electrolytic capacitor 1 may be surface-mounted on a printed wiring board (not shown) by soldering the lower surface 2c of the cathode lead 2 to a conductor pattern formed on the surface of the printed wiring board.

The cathode lead 2 has a flat upper surface 2a. The upper surface 2a of the cathode lead 2 has an area which allows the mounting of the capacitor element C.

The anode wire 7 may be made of e.g. tantalum, similarly to the porous sintered body. The anode wire 7 has a predetermined length extending from a generally central portion of the end surface 4a of the element body 4. The anode wire 7 is connected to the upper surface 3a of the anode lead 3 via the conductive bolster 5.

The anode lead 3 may comprise a conductive plate of copper for example. Similarly to the cathode lead 2, the anode lead 3 has a stepped lower surface. The anode lead 3 has a thicker-walled portion 13 having a predetermined thickness and a thinner-walled portion 14 which is thinner than the thicker-walled portion. The stepped lower surface of the anode lead 3 may be formed by half-etching.

The anode lead 3 has a flat upper surface 3a which is generally flush with the upper surface 2a of the cathode lead 2. The upper surface 3a of the anode lead 3 has an area which is smaller than that of the upper surface 2a of the cathode lead 2 and which allows the mounting of the conductive bolster 5. The lower surface 3c of the anode lead 3 (See FIGS. 3 and 4) is exposed at the lower surface of the resin package 6 to serve as a terminal surface. Therefore, the solid electrolytic capacitor 1 can be surface-mounted on a printed wiring board for example.

The conductive bolster 5 is generally in the form of a rectangular parallelepiped. The conductive bolster 5 is made of nickel or an alloy containing nickel as typified by 42 alloy. The conductive bolster 5 functions to electrically connect the anode wire 7, which extends generally horizontally, to the anode lead 3. The conductive bolster 5 is connected to the upper surface 3a of the anode lead 3 with a conductive adhesive.

In bonding the capacitor element C on the cathode lead 2, a spacing is formed between the anode wire 7 and the anode lead 3 in the absence of the conductive bolster 5, so that conduction cannot be established between the anode wire and the anode lead 3. According to the present invention, however, the conductive bolster 5 is provided for substantially raising the upper surface 3a of the anode lead 3, so that the anode wire 7 can be electrically connected to the anode lead 3. The conductive bolster 5 has a height which is generally equal to the distance H (See FIG. 3) between the lower surface of the anode wire 7 which extends substantially horizontally and the upper surface 3a of the anode lead 3.

The upper surface 5a of the conductive bolster 5 is connected to the anode wire 7 by resistance welding such as spot welding. It is conceivable to connect the conductive bolster 5 to the anode wire 7 with the use of a conductive resin paste or by soldering. However, since the anode wire 7 is generally columnar, only a small contact area is provided between the anode wire and the upper surface 5a of the conductive bolster 5. Further, the use of a conductive resin paste increases the connection resistance, thereby deteriorating the impedance characteristics. Therefore, to provide a strong connection between the conductive bolster 5 and the anode wire 7, it is preferable to use tantalum as a material for forming the conductive bolster 5 and to select resistance welding as a method for connecting the two members.

The resin package 6 is provided for covering the capacitor element C, the conductive bolster 5, the cathode lead 2 and the anode lead 3. The resin package 6 provides the appearance of the solid electrolytic capacitor 1. At the lower surface side of the resin package 6, the lower surfaces 2c, 3c of the cathode lead 2 and the anode lead 3 are exposed to the outside. The exposed lower surfaces 2c, 3c are generally equal in size to each other (See FIG. 4).

In this way, according to the solid electrolytic capacitor 1, the cathode lead 2 supports the element body 4 and part of the cathode lead 2 is exposed at the lower surface of the resin package 6 to serve as a terminal surface. On the other hand, the anode lead 3 is electrically connected to the conductive bolster 5 to support the anode wire 7 via the conductive bolster. Part of the anode lead 3 is exposed at the lower surface of the resin package 6 to serve as a terminal surface. Therefore, the solid electrolytic capacitor 1 can be surface-mounted for example on a printed wiring board by utilizing the cathode lead 2 and the anode lead 3 exposed at the lower surface of the resin package 6.

Moreover, unlike the prior art structure, the leads need not be bent, because the cathode lead 2 and the anode lead 3 of the solid electrolytic capacitor 1 are exposed at the lower surface of the resin package 6. Thus, since a bending stress caused by bending the leads is not exerted on the resin package 6, it is not necessary to increase the thickness of the resin package 6. Therefore, it is possible to make the capacitor element C occupy the inner space of the resin package 6 as much as possible. For example, for a capacitor element C of a same given capacitance, the resin package of the present invention can be made smaller than that of a prior art structure, which leads a size reduction. In other words, for a resin package of a same given size, a capacitor element C of a higher capacitance may be incorporated in the resin package 6 according to the present invention than according to the prior art structure.

Figure 6:
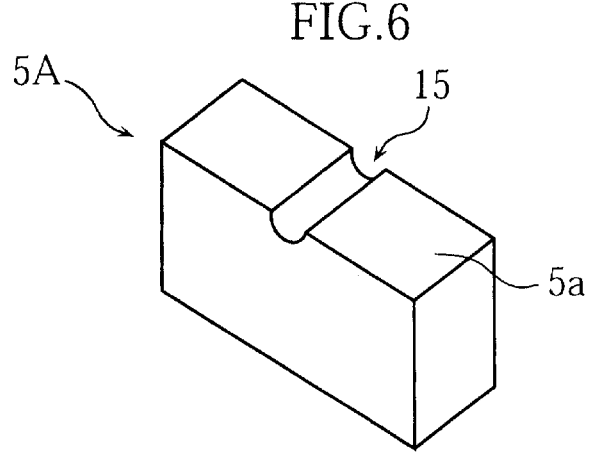
FIG. 6 is a perspective view showing another conductive bolster.

The conductive bolster may have another configuration. For example, a conductive bolster 5A as shown in FIG. 6 may be used which has an upper surface 5a formed with a groove 15. The groove 15 may have an inner diameter which is substantially equal to or slightly larger than the outer diameter of the anode wire 7. By disposing the anode wire 7 on the groove 15, a large contact area is provided between the anode wire 7 and the conductive bolster 5A. The two members can be connected to each other more strongly by resistance welding.

Figure 7:
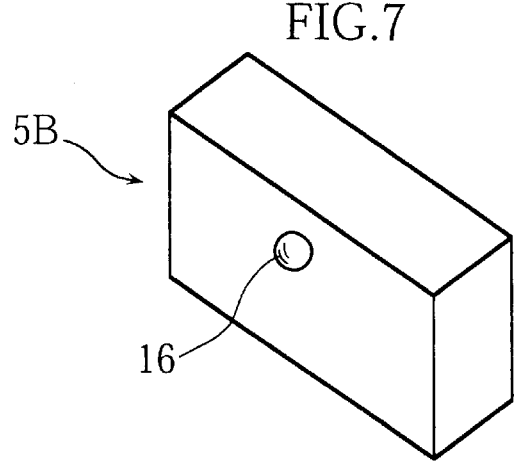
FIG. 7 is a perspective view showing still another conductive bolster.

A conductive bolster 5B as shown in FIG. 7 maybe used which is formed with a through-hole 16 extending in the thickness direction. The through-hole 16 may have an inner diameter which is slightly larger than the outer diameter of the anode wire 7. The anode wire 7 and the conductive bolster 5B may be connected to each other strongly by performing resistance welding with the anode wire 7 inserted in the through-hole 16.

Figure 5:
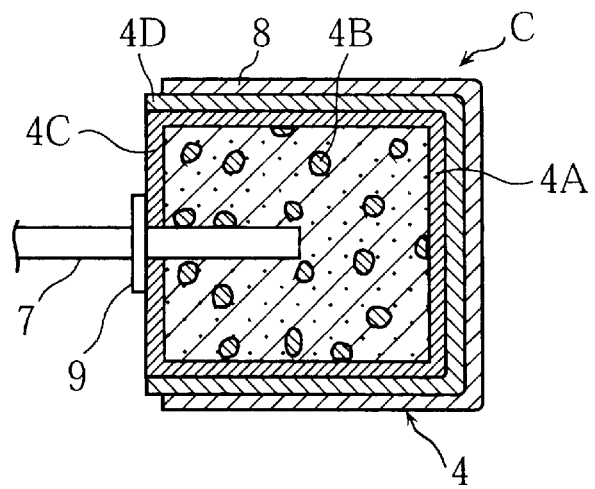
FIG. 5 is a sectional view of a capacitor element.

Next, a method for making the solid electrolytic capacitor will be described with reference to FIGS. 5 and 8–16. First, a description is given to a method for making the element body 4 of the capacitor element C. As shown in FIG. 5, a porous sintered body 4A is first formed by compacting metal powder such as tantalum powder followed by sintering. Then, a base end of an anode wire 7 is embedded in the porous sintered body 4A. Subsequently, a surface oxide film 4B as a dielectric layer is formed on the powder of the porous sintered body 4A. Then, a semiconductor layer 4C, a graphite layer 4D and a metal layer 8 are laminated on the outer surfaces of the porous sintered body 4A.

Figure 8:
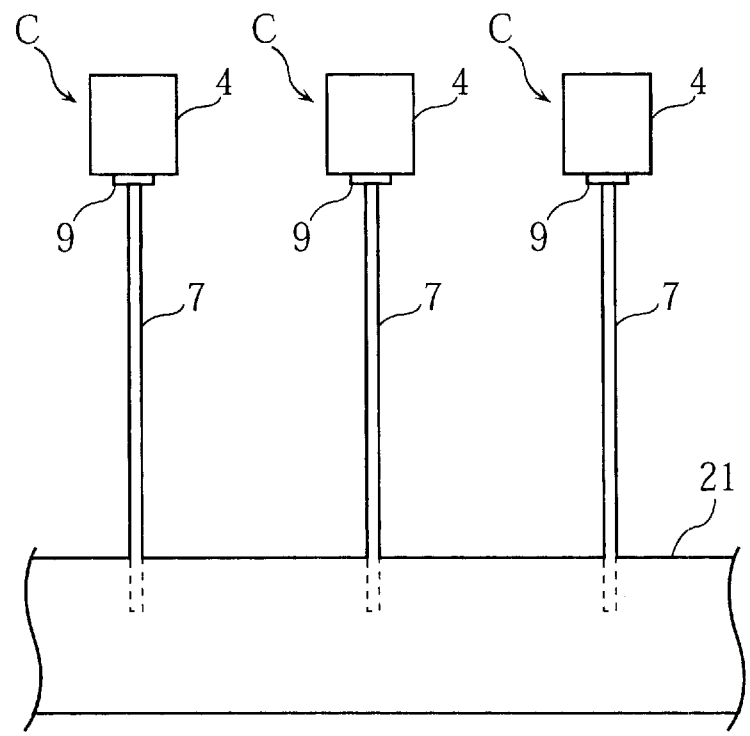
FIG. 8 illustrates a process step of a method for making the solid electrolytic capacitor of FIG. 1.

As shown in FIG. 8, the distal end of each anode wire 7, which extends from the element body 4, is welded to a band-like tie bar 21. A plurality of capacitor elements C are connected to the tie bar 21 as spaced from each other at a predetermined pitch.

Figure 9:
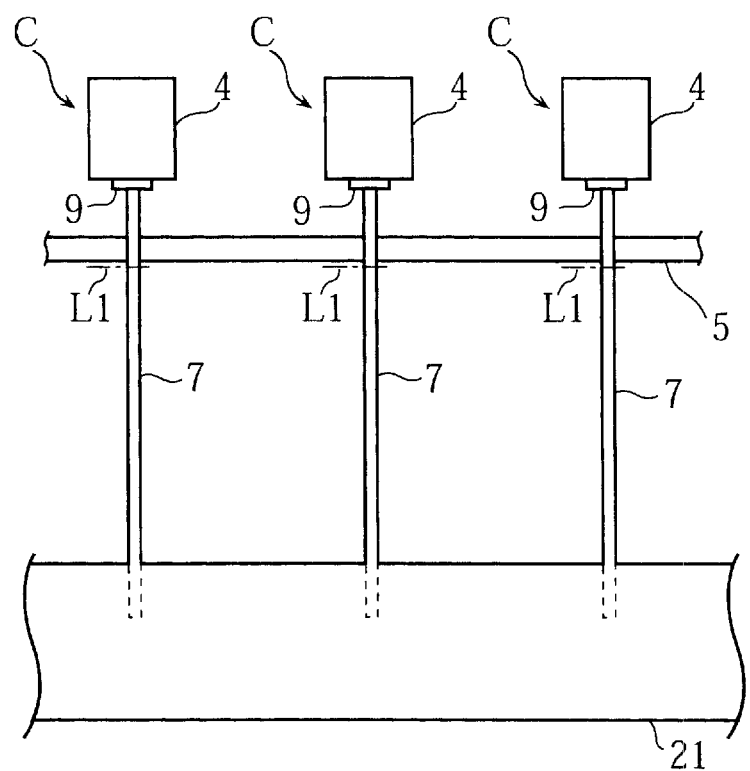
FIG. 9 illustrates a process step of a method for making the solid electrolytic capacitor of FIG. 1.

Then, as shown in FIG. 9, a bar-like conductive bolster 5 having a predetermined length is prepared. The conductive bolster bar 5 is so positioned as to bridge the anode wires 7 of the plural capacitor elements C. Subsequently, the conductive bolster bar 5 is connected to the anode wires 7 by resistance welding such as spot welding.

Figure 10:
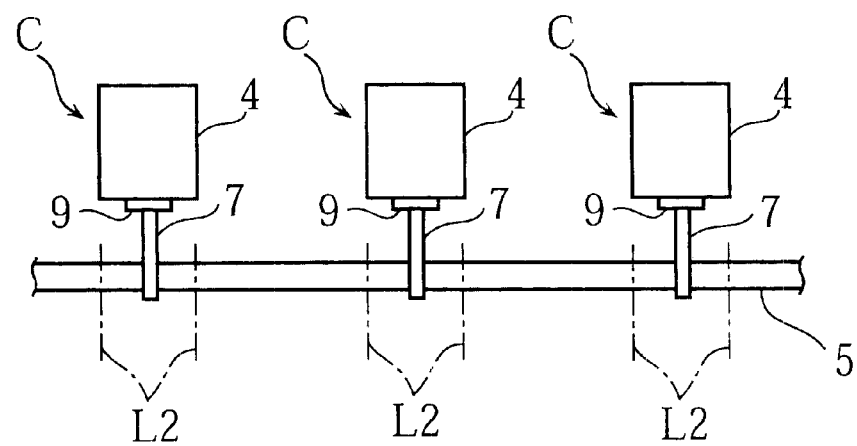
FIG. 10 illustrates a process step of a method for making the solid electrolytic capacitor of FIG. 1.

Then, the anode wires 7 are cut along the cutting lines L1 shown in FIG. 9 and the tie bar 21 is removed (See FIG. 10). Thereafter, the conductive bolster bar 5 is cut along the cutting lines L2 shown in FIG. 10 to remove excess portions. As a result, a plurality of conductive bolsters 5 are prepared correspondingly to the capacitor elements C.

Figure 11:
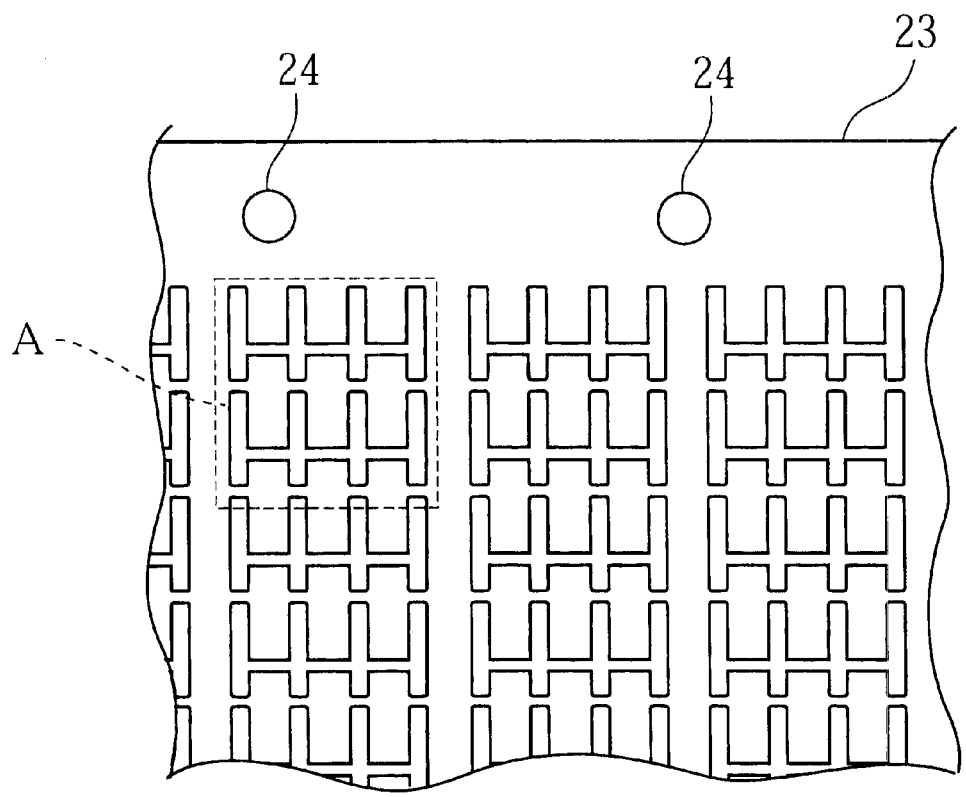
FIG. 11 illustrates a process step of a method for making the solid electrolytic capacitor of FIG. 1.

For making cathode leads 2 and anode leads 3, a plate-like frame 23 as shown in FIG. 11 is used which has a thickness of about 0.15 mm. The plate-like frame 23 is subjected to punching. The plate-like frame 23 is formed, at edge portions thereof, with engaging holes 24 for fixing to a non-illustrated fixing base.

Figure 12:
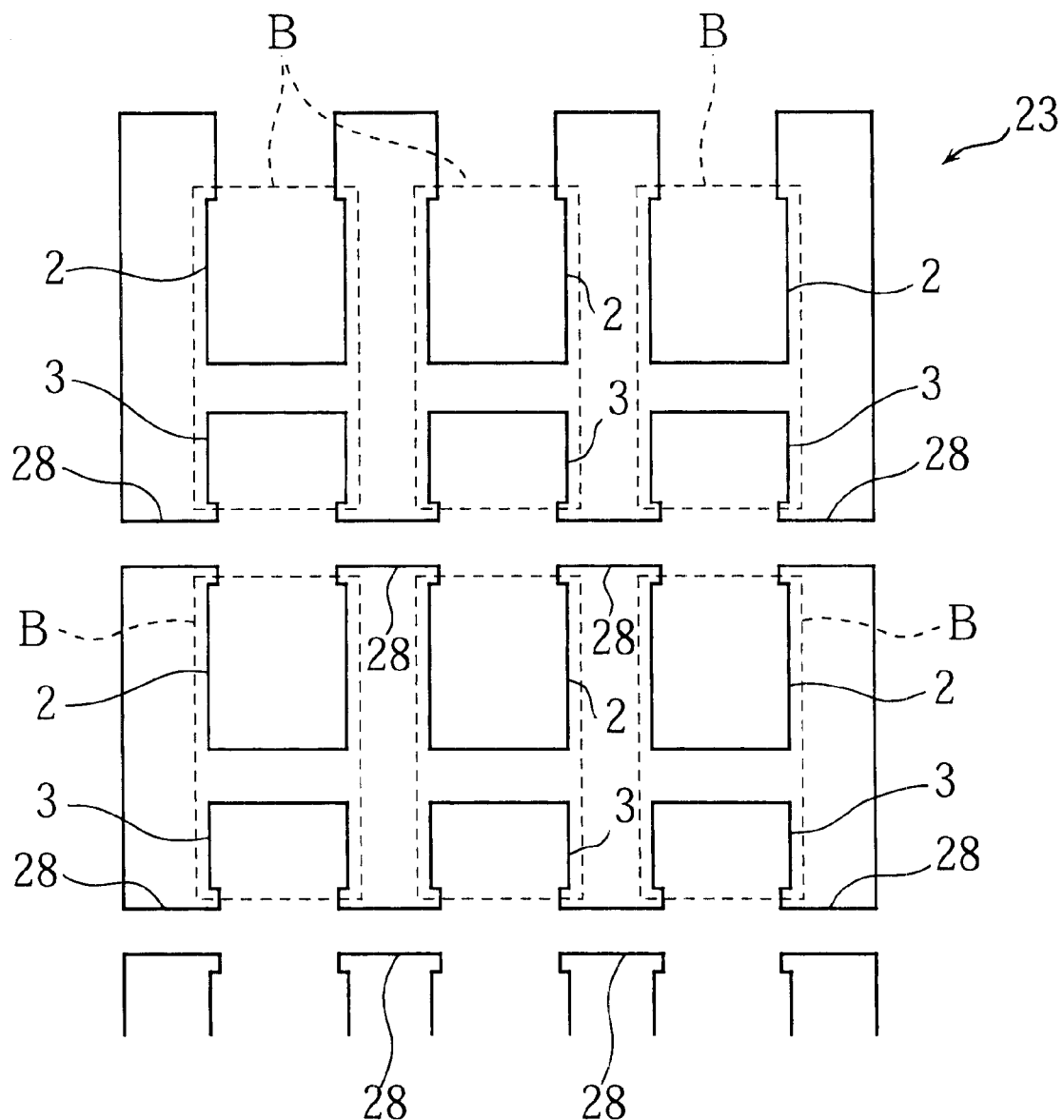
FIG. 12 illustrates a process step of a method for making the solid electrolytic capacitor of FIG. 1.
Figure 13:
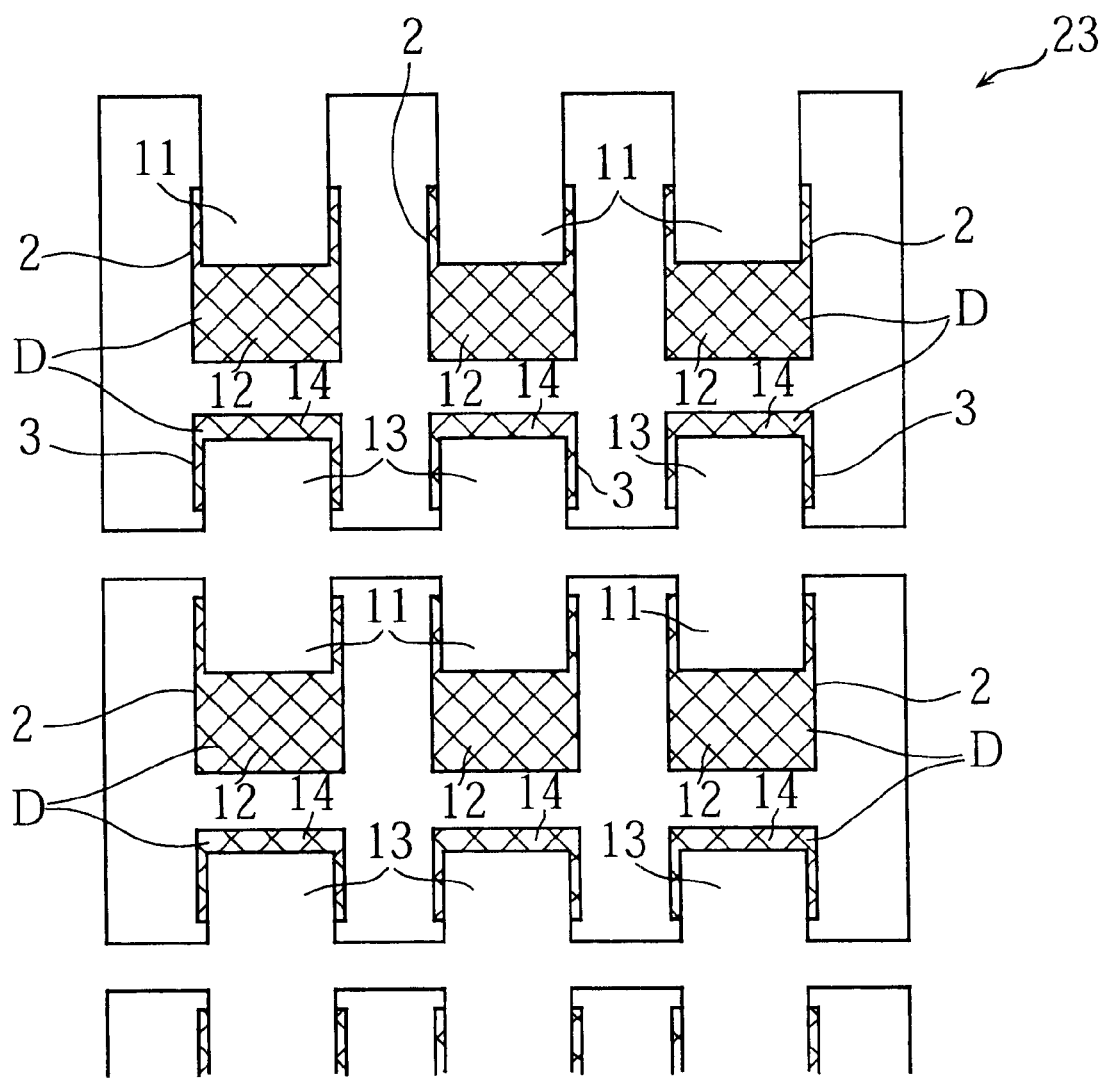
FIG. 13 illustrates a process step of a method for making the solid electrolytic capacitor of FIG. 1.

FIG. 12 is an enlarged view of the region A indicated by broken lines in FIG. 11. In the plate-like frame 23, a plurality of unit regions B (See FIG. 12), which finally become solid electrolytic capacitors, are arranged in plural rows and columns. In each of the unit regions B, an anode lead 3 and a cathode lead 2 are arranged with respective inner ends spaced from each other by a predetermined distance. The leads 2, 3 of the respective unit regions B are connected to each other via peripheral portions of the plate-like frame 23 and connection portions 28. As shown in FIG. 13, the reverse surfaces of the leads 2, 3 of the lead frame 23 are subjected to half-etching (See hatched portions D). Thus, thin-walled portions 12, 14 as shown in FIG. 3 are provided at the reverse surface side of the leads 2, 3.

Figure 14:
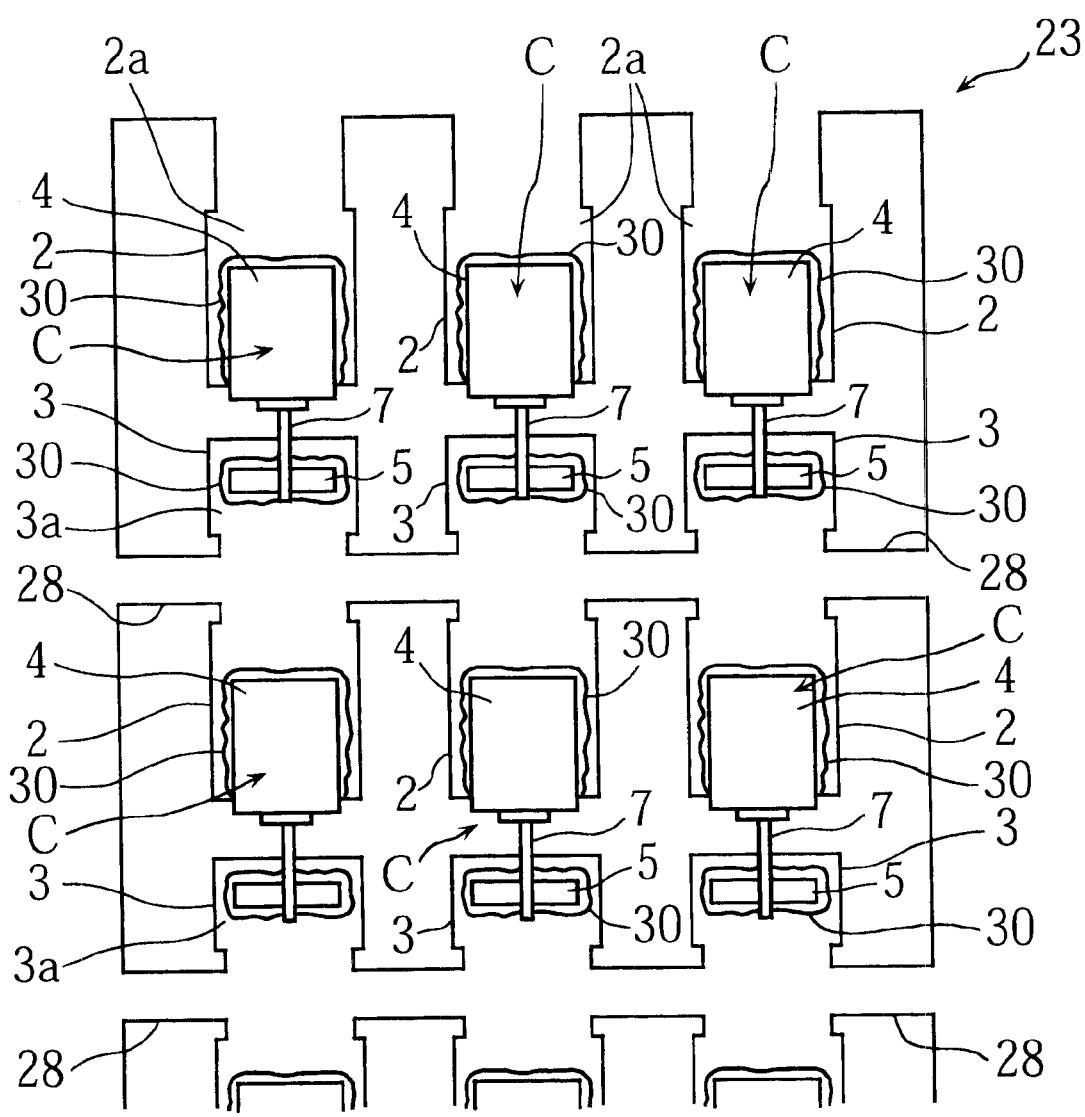
FIG. 14 illustrates a process step of a method for making the solid electrolytic capacitor of FIG. 1.

Subsequently, a capacitor element C connected to a conductive bolster 5 is connected to each pair of leads 2 and 3. Specifically, as shown in FIG. 14, conductive adhesive 30 is applied to the upper surfaces 2a and 3a of the leads 2 and 3. The conductive adhesive 30 may be conductive paste such as Ag paste. Then, an element body 4 is positioned on the upper surface 2a of each cathode lead 2, whereas the conductive bolster 5 is positioned on the upper surface 3a of the corresponding anode lead 3. Thus, the capacitor element C and the conductive bolster 5 are mounted on the leads 2, 3 for electrical connection.

Figure 15:
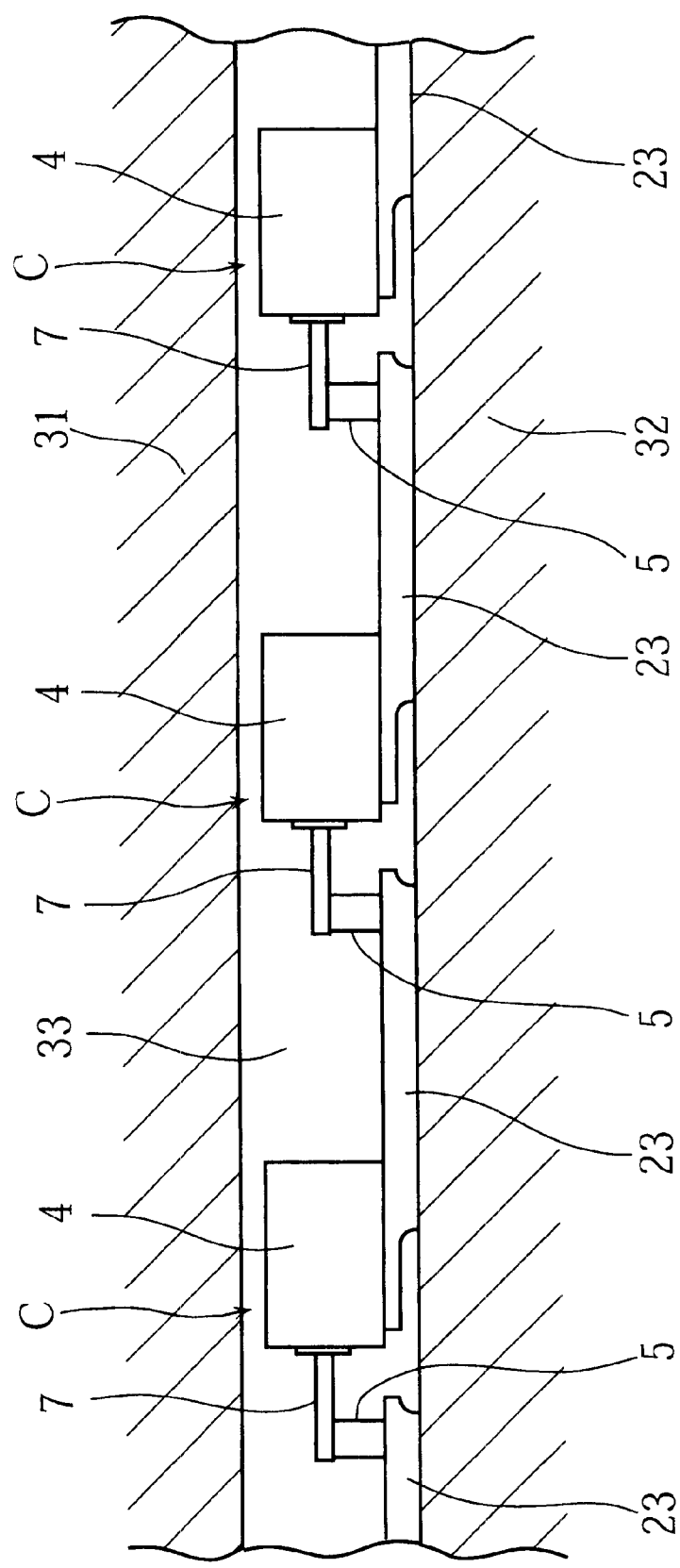
FIG. 15 illustrates a process step of a method for making the solid electrolytic capacitor of FIG. 1.

Thereafter, a resin package 6 is formed by transfer molding. Specifically, as shown in FIG. 15, the plate-like frame 23 and the plurality of capacitor elements C are enclosed from above and below between mold members 31, 32. Subsequently, a thermosetting resin such as an epoxy resin in a fluid state is injected into the cavity 33 for solidification. As a result, the plate-like frame 23, the capacitor elements C and the conductive bolster 5 are integrally molded.

Figure 16:
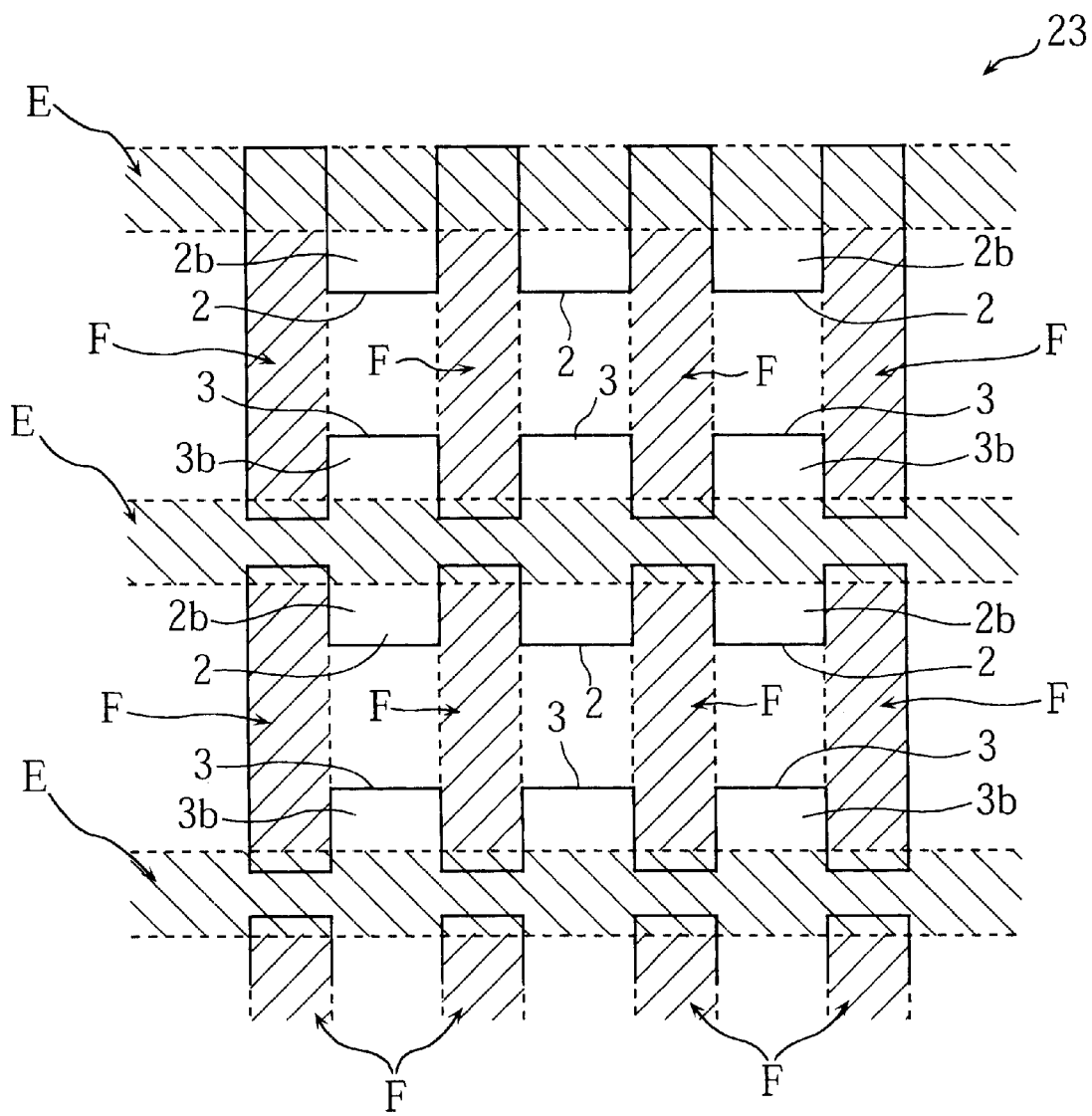
FIG. 16 illustrates a process step of a method for making the solid electrolytic capacitor of FIG. 1.

Then, as shown in FIG. 16 (which illustrates the reverse surface side of the region A of the plate-like frame 23), surface treatment by plating is performed with respect to the lower surfaces 2b, 3b of the leads 2, 3. The lower surfaces 2b, 3b of the leads 2, 3 finally become terminals exposed to the outside. Thereafter, the portions E indicated by hatching in FIG. 16 are cut to be removed using a dicing saw having a thickness of about 0.3 mm. In this way, by horizontally cutting the intermediate molded article, horizontally extending intermediate articles are provided. Subsequently, the horizontally extending intermediate articles are cut vertically to remove the portions F indicated by hatching in FIG. 16. As a result, solid electrolytic capacitors 1 are provided, as shown in FIGS. 1 and 2.

In this way, according to the above-described manufacturing method, a multiplicity of solid electrolytic capacitors 1 can be formed simultaneously by utilizing a plate-like frame 23. Therefore, the manufacturing cost can be reduced. In the above-described manufacturing method, the conductive bolster 5 is connected to the anode wire 7 before its connection to the anode lead 3. Alternatively, however, the conductive bolster 5 may be connected to the anode lead 3 before its connection to the anode wire 7.

Figure 17:
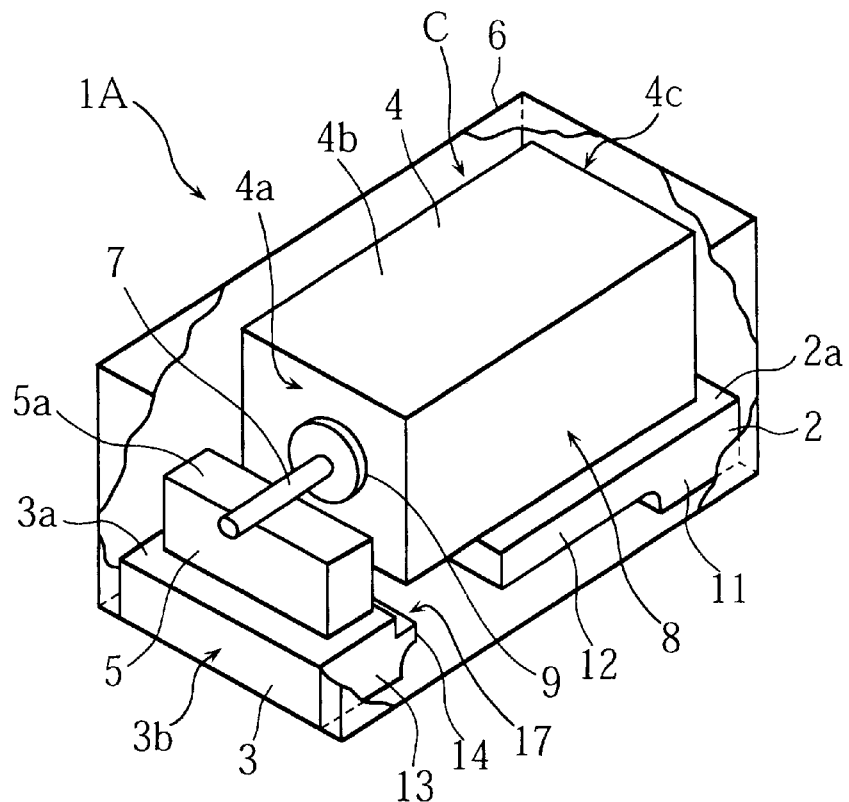
FIG. 17 is a perspective view, which is partially cut away, showing a solid electrolytic capacitor according to a second embodiment of the present invention.

FIG. 17 is a perspective view, which is partially cut away, showing a solid electrolytic capacitor according to a second embodiment of the present invention. In the illustrated solid electrolytic capacitor 1A, the anode lead 3 has an upper surface which is formed, at an end thereof, with a stepped portion 17. The stepped portion 17 may be formed by etching the anode lead 3 for example. The structures of other portions are substantially the same as those of the first embodiment shown in FIG. 1.

Figure 18:
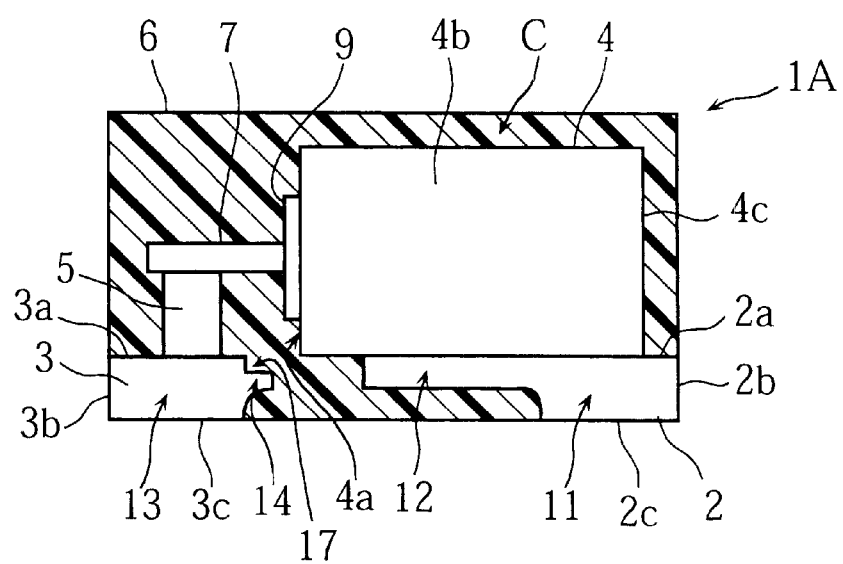
FIG. 18 is a see-through side view showing the solid electrolytic capacitor of FIG. 17.

In the case where the element body 4 is relatively large or the resin package 6 is deformed by compression during the molding of the resin, the lower edge of the end surface 4a of the element body 4 may come into contact with the anode lead 3. However, the provision of the stepped portion 17 at the anode lead 3 increase the spacing between the end surface 4a of the element body 4 and the anode lead 3 (See FIG. 18). This reduces the possibility that the element body 4 comes into contact with the anode lead 3, thereby preventing a short-circuit between the two members. Therefore, it is possible to mount a relatively large element body 4, which enables the provision of a solid electrolytic capacitor of a high capacitance.

Figure 19:
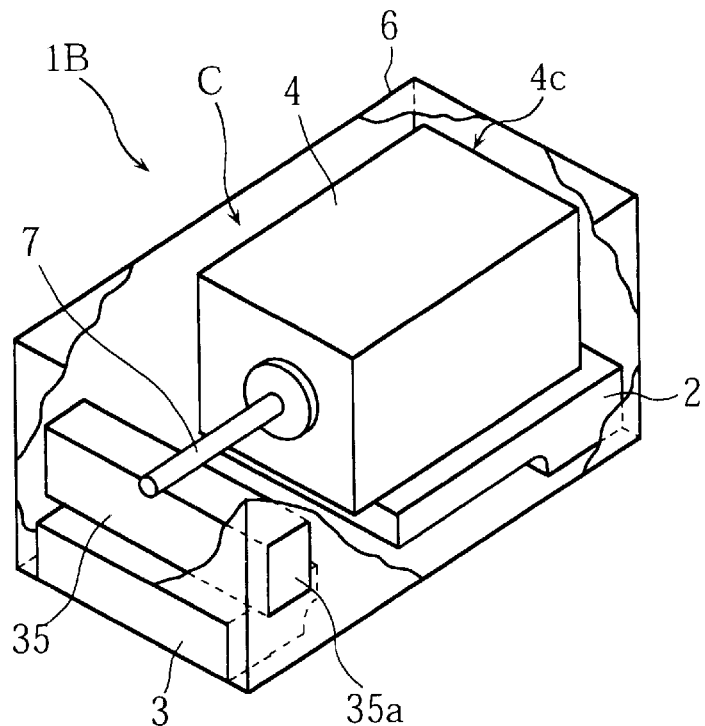
FIG. 19 is a perspective view, which is partially cut away, showing a solid electrolytic capacitor according to a third embodiment of the present invention.

FIG. 19 is a perspective view, which is partially cut away, showing a solid electrolytic capacitor according to a third embodiment of the present invention. In the illustrated solid electrolytic capacitor 1B, the conductive bolster 35 extends longitudinally until its opposite end surfaces 35a reach the respective side surfaces of the resin package 6. The opposite end surfaces 35a of the conductive bolster 35 are exposed to the outside. The structures of other portions are substantially the same as those of the first embodiment shown in FIG. 1.

In the above-described structure, the opposite end surfaces 35a of the conductive bolster 35 are exposed at a location adjacent to the anode lead 3 which serves as the anode terminal. Such a structure of the solid electrolytic capacitor 1B makes it possible to instantly distinguish between the anode lead 2 and the cathode lead 3, or between the anode and the cathode just by viewing from the outside. This facilitates the handling of the solid electrolytic capacitor B.

The solid electrolytic capacitor element 1B may be formed by the following method. In this method, a conductive bolster 35 is not firstly connected to the anode wire 7 of a capacitor element C. Instead, a bar-like conductive bolster 35 elongated to have a predetermined length is prepared. Subsequently, the conductive bolster bar 35 is connected to a plurality of anode leads 3 of the plate-like frame 23 in a bridging manner. Then, respective anode wires 7 of capacitor elements C are positioned on the bar-like conductive bolster 35 for connection. Then, the plate-like frame 23 is cut after molding together with the conductive bolster bar 35. With this method, the conductive bolster bar 35 is cut directly for conveniently exposing the opposite end surfaces 35a to the outside, which enhances the manufacturing efficiency.

Figure 20:
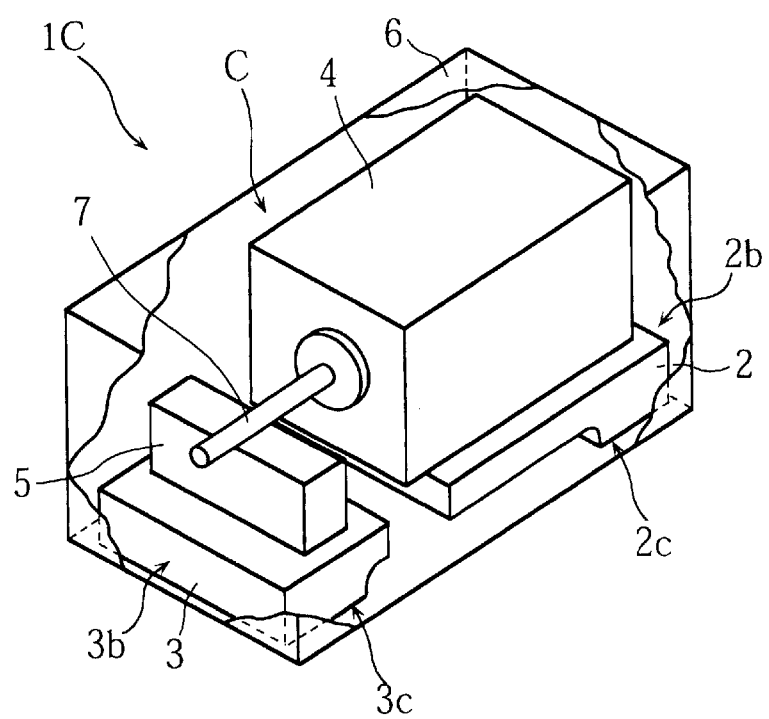
FIG. 20 is a perspective view, which is partially cut away, showing a solid electrolytic capacitor according to a fourth embodiment of the present invention.

FIG. 20 is a perspective view, which is partially cut away, showing a solid electrolytic capacitor according to a fourth embodiment of the present invention. In the illustrated solid electrolytic capacitor 1C, the cathode lead 2 and the anode lead 3 are not exposed at the opposite end surfaces of the resin package 6. In the solid electrolytic capacitor 1 shown in FIG. 1, the respective side surfaces 2b, 3b of the leads 2, 3 are flush with the end surfaces of the resin package 6 for exposure to the outside. By contrast, in the fourth embodiment, the leads 2, 3 are arranged on the inner side of the resin package 6. The respective side surfaces 2b, 3b of the leads 2, 3 are not exposed to the outside. That is, only the lower surfaces 2c, 3c of the leads 2, 3 are exposed at the lower surface of the resin package 6. The structures of other portions are substantially the same as those of the first embodiment shown in FIG. 1.

With this structure, the leads 2, 3 are provided on the inner side of the resin package 6. Therefore, when the solid electrolytic capacitor 1C is mounted on e.g. a printed wiring board (not shown), it is possible to prevent a short circuit between the leads 2, 3 and another electronic component mounted adjacent to the solid electrolytic capacitor 1C.

Figure 21:
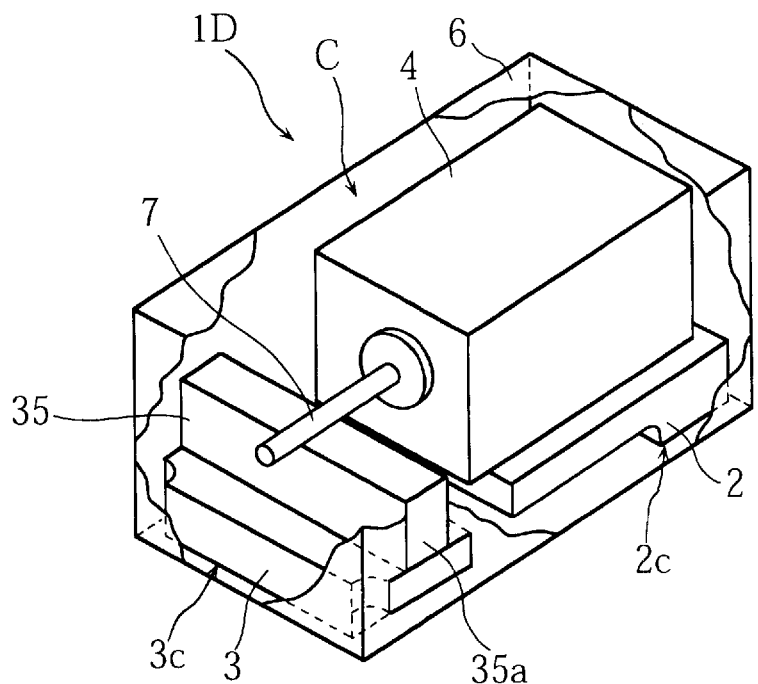
FIG. 21 is a perspective view, which is partially cut away, showing a solid electrolytic capacitor according to a fifth embodiment of the present invention.

FIG. 21 is a perspective view, which is partially cut away, showing a solid electrolytic capacitor according to a fifth embodiment of the present invention. In the illustrated solid electrolytic capacitor 1D, the conductive bolster 35 extends longitudinally so that its opposite end surfaces 35a are exposed to the outside. The cathode lead 2 and the anode lead 3 are arranged on the inner side of the resin package 6. Only the lower surfaces 2c, 3c of the cathode lead 2 and the anode lead 3 are exposed at the lower surface of the resin package 6. As shown in FIG. 21, the anode lead 3 connected to the conductive bolster 35 is made relatively long similarly to the elongated conductive bolster 35. The other portions are structurally similar to those of the first embodiment shown in FIG. 1. With this structure, the conductive bolster 35 can be stably mounted on the anode lead 3.

Figure 22:
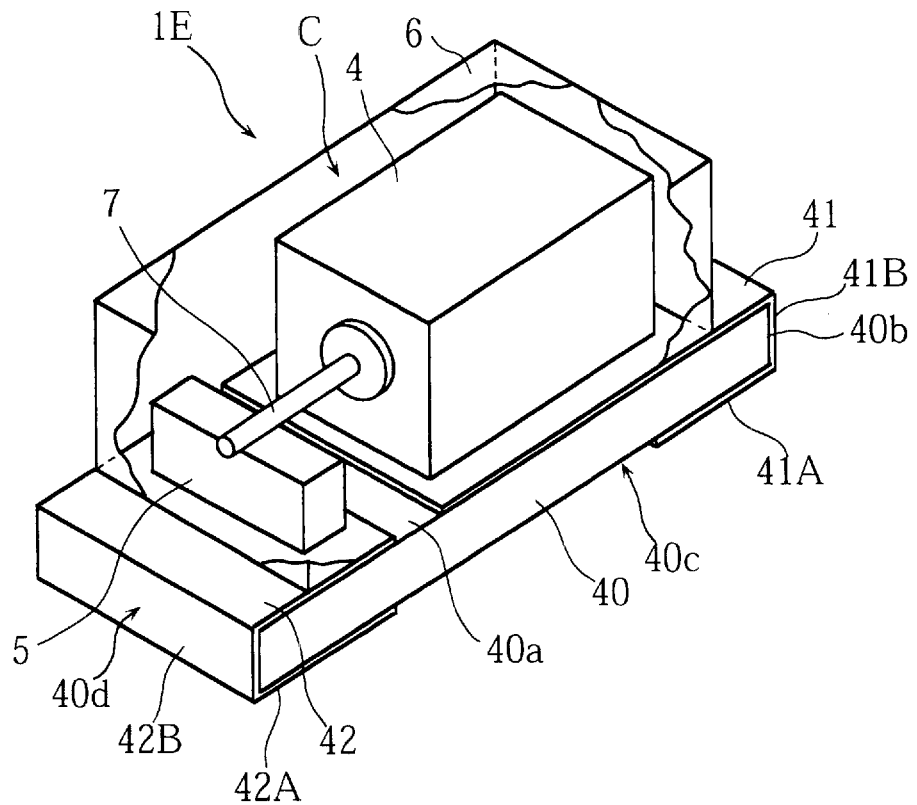
FIG. 22 is a perspective view, which is partially cut away, showing a solid electrolytic capacitor according to a sixth embodiment of the present invention.

FIG. 22 is a perspective view, which is partially cut away, showing a solid electrolytic capacitor according to a sixth embodiment of the present invention. The illustrated solid electrolytic capacitor 1E is provided with an insulating substrate 40 instead of a cathode lead 2 and an anode lead 3. In the solid electrolytic capacitor 1E, a capacitor element C and a conductive bolster 5 are mounted on the substrate 40.

The substrate 40 may be formed of a glass-fiber-reinforced epoxy resin, polyimide resin such as BT-resin, or a ceramic material. The substrate 40 has an upper surface 40a formed with a cathode pad 41 and an anode pad 42. Further, the substrate has a lower surface 40c provided with terminals 41A, 42A which are electrically connected to the cathode pad 41 and the anode pad 42, respectively. One end surface 40b of the substrate 40 is formed with a conductor portion 41B. The cathode pad 41 is electrically connected to the terminal 41A of the lower surface 40c via the conductor portion 41B. The other end surface 40d of the substrate 40 is formed with a conductor portion 42B. The anode pad 42 is electrically connected to the terminal 42A of the lower surface 40c via the conductor portion 42B.

The element body 4 of the capacitor element C is connected to the upper surface of the cathode pad 41 via a conductive adhesive. Further, the conductive bolster 5 is connected to the upper surface of the anode pad 42 via a conductive adhesive.

The resin package 6 is formed on the upper surface 40a of the substrate 40 to cover the capacitor element C, the conductive bolster 5, part of the cathode pad 41 and part of the anode pad 42. The resin package 6 is not formed at opposite ends of the substrate 40.

With this structure, instead of the leads 2, 3 of the first embodiment, the substrate 40 is utilized for supporting the capacitor element C and the conductive bolster 5. Therefore, it is not necessary to perform the process step of bending the leads which has been necessary in making the prior art capacitor. Therefore, a bending stress is not exerted on the resin package 6. Thus, similarly to the first embodiment, it is possible to make the capacitor element C occupy the inner space of the resin package 6 as much as possible. For example, for mounting a capacitor element C of a same given capacitance, the resin package 6 can be made smaller than that of a prior art structure. This leads to a size reduction of the solid electrolytic capacitor 1E.

Figure 23:
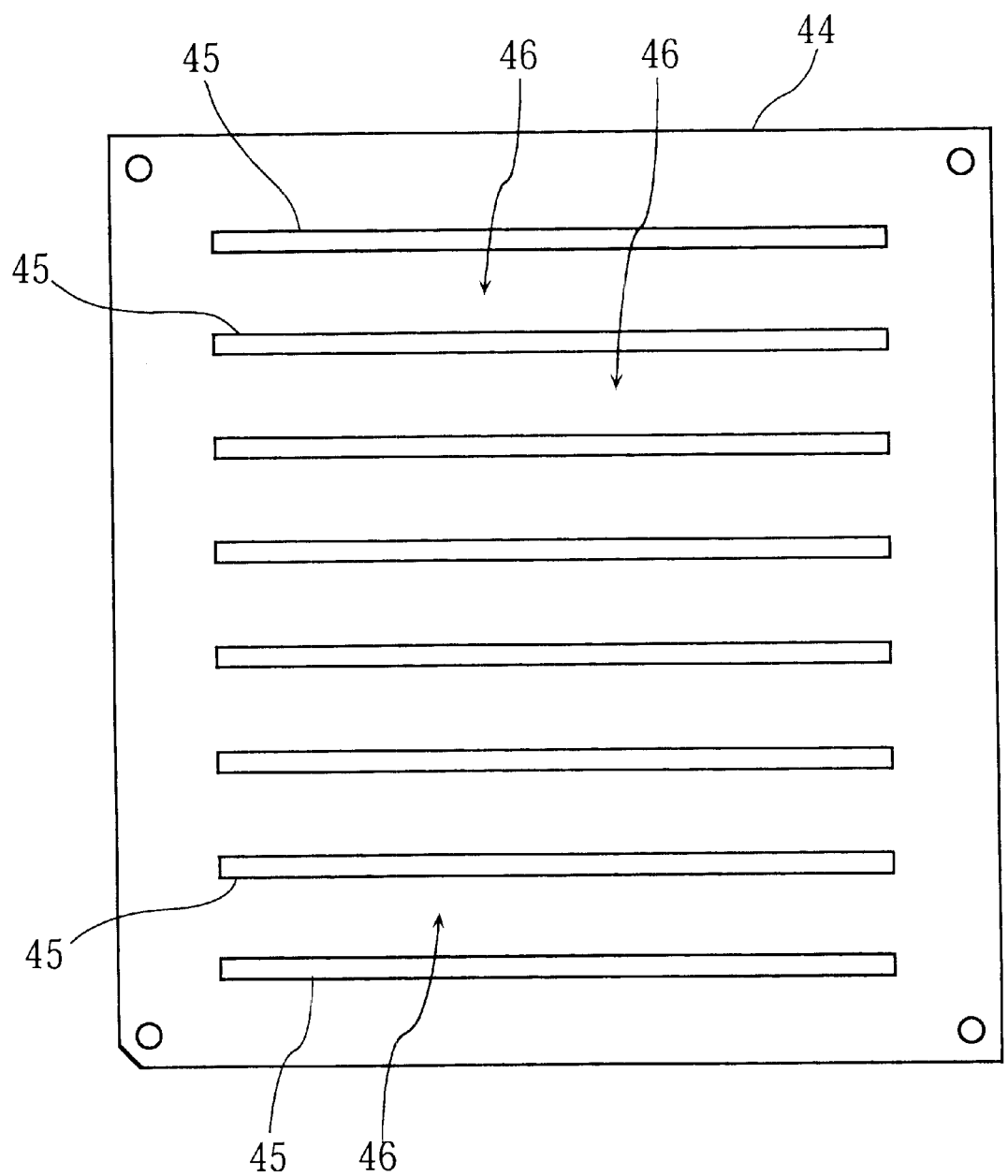
FIG. 23 illustrates a process step of a method for making the solid electrolytic capacitor of FIG. 22.

The method for making the solid electrolytic capacitor shown in FIG. 22 will now be described below with reference to FIGS. 23–28. In this manufacturing method, a flat material board 44 as shown in FIG. 23 is utilized. The material board 44 is formed with a plurality of horizontally extending slits 45 which are vertically spaced from each other at a predetermined pitch. Between respective adjacent slits 45 are defined band-like members 46. A plurality of unit regions G (See FIG. 24) which finally become solid electrolytic capacitors are arranged in each of the band-like members 46.

Figure 24:
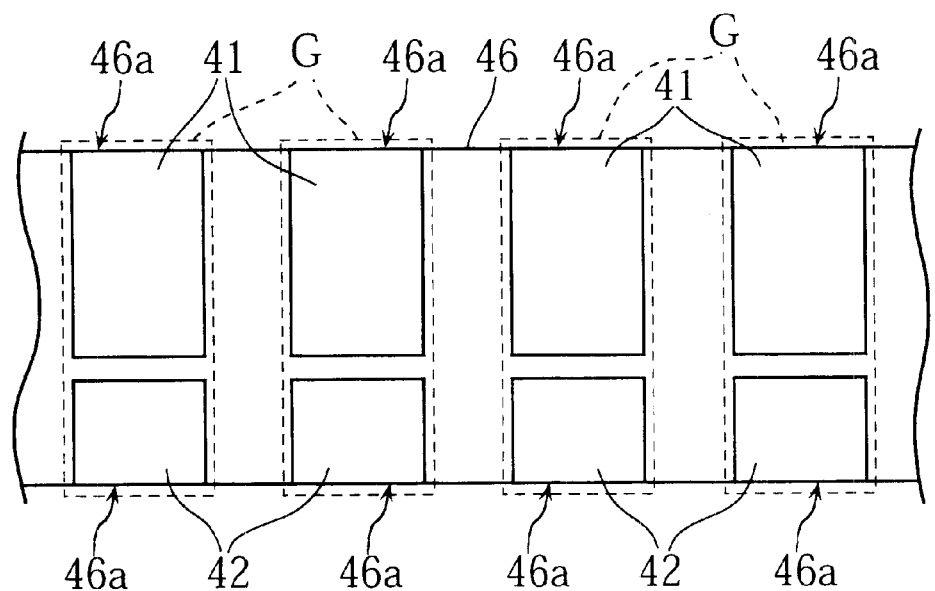
FIG. 24 illustrates a process step of a method for making the solid electrolytic capacitor of FIG. 22.
Figure 25:
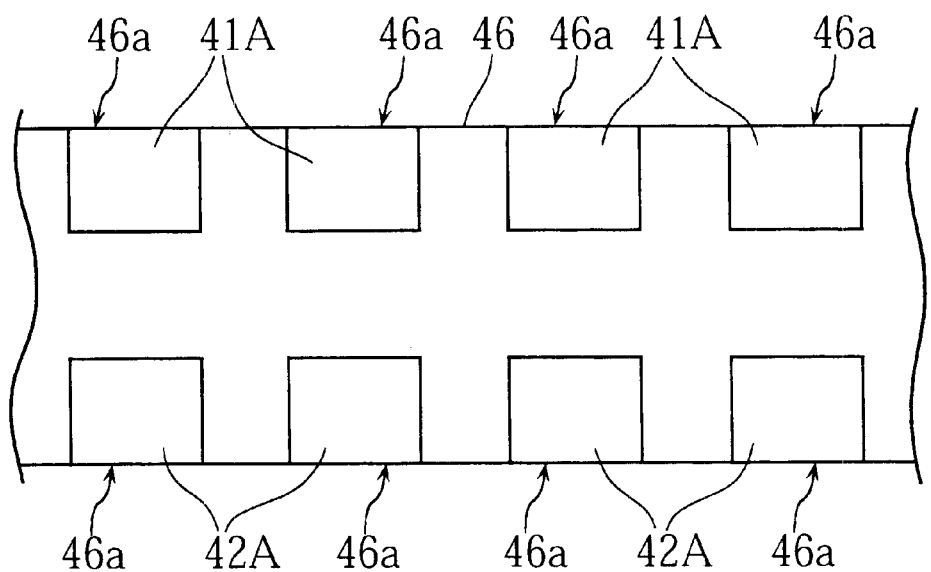
FIG. 25 illustrates a process step of a method for making the solid electrolytic capacitor of FIG. 22.

As shown in FIG. 24, a cathode pad 41 and an anode pad 42 are formed, by photolithography for example, in each unit region G on the obverse surface of each band-like member 46. As shown in FIG. 25, a terminal portion 41A and a terminal portion 42A as a conductor pattern are formed, by photolithography for example, in each unit region G on the reverse surface of each band-like member 46. The band-like member 46 has opposite end surfaces 46a provided with conductor portions 41B, 42B (See FIG. 22) formed by electrolytic plating for example. The terminal portions 41A, 42A are electrically connected to the cathode pad 41 and the anode pad 42 via conductor portions 41B, 42B, respectively.

Figure 26:
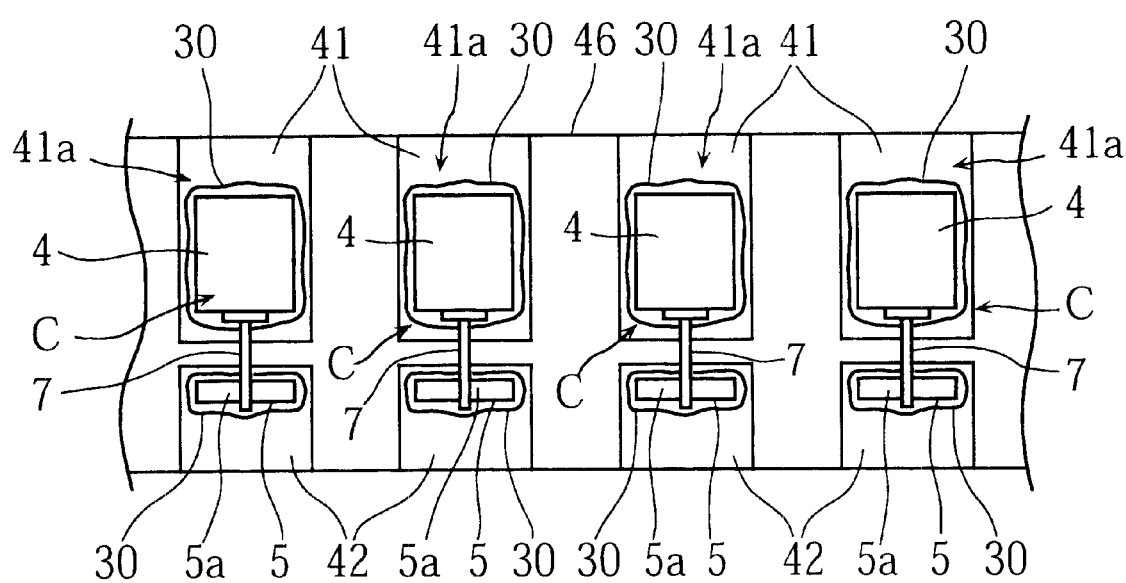
FIG. 26 illustrates a process step of a method for making the solid electrolytic capacitor of FIG. 22.

Subsequently, as shown in FIG. 26, a capacitor element C is connected to each pair of a cathode pad 41 and an anode pad 42. Specifically, as described with reference to FIGS. 8–10 of the first embodiment, a capacitor element C is prepared as connected to a conductive bolster 5. Then, a conductive adhesive 30 is applied to the upper surface 41a of each cathode pad 41 and the upper surface 42a of each anode pad 42. Subsequently, an element body 4 is positioned on each cathode pad 41 to which the conductive adhesive 30 has been applied. The anode wire 7 extending from the element body 4 is positioned on the upper surface 5a of the conductive bolster 5. The anode wire 7 is connected to the conductive bolster 5 by resistance welding.

Figure 27:
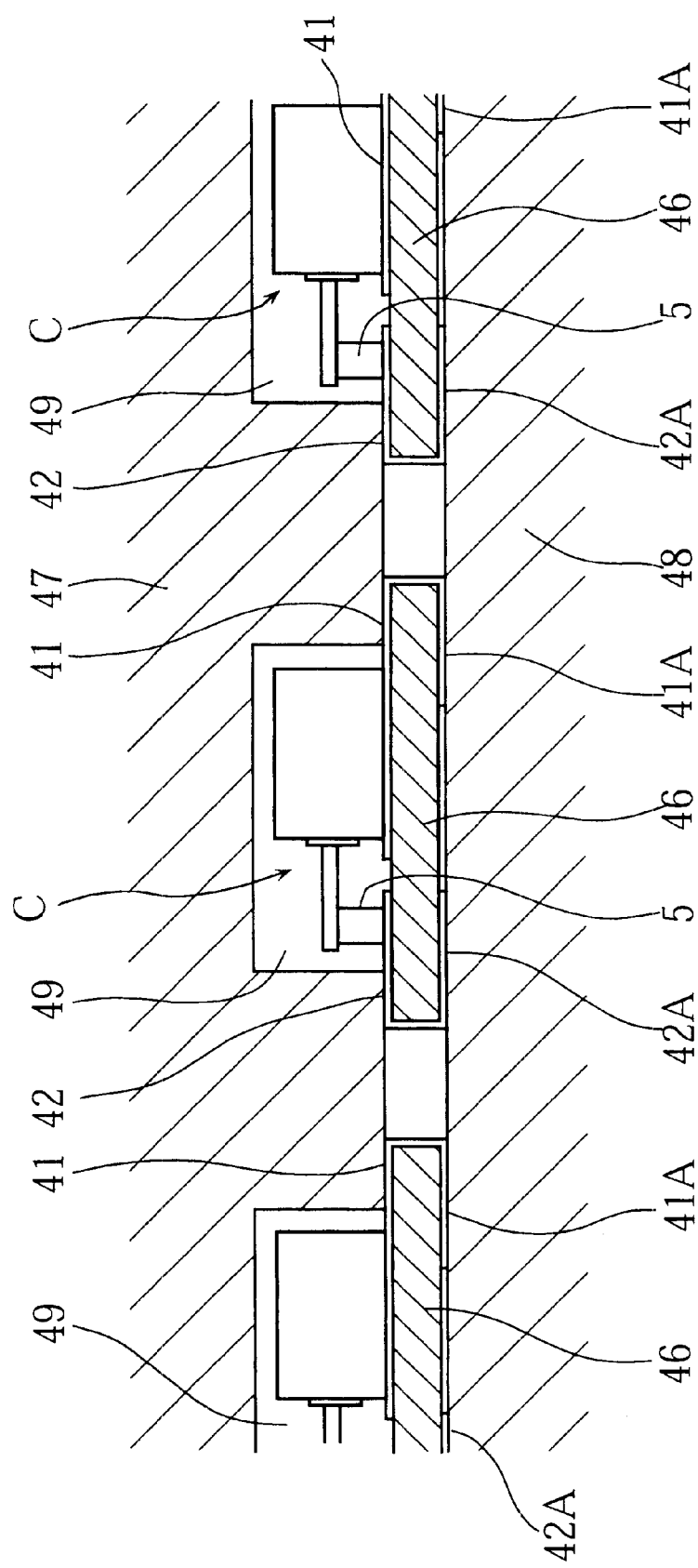
FIG. 27 illustrates a process step of a method for making the solid electrolytic capacitor of FIG. 22.
Figure 28:
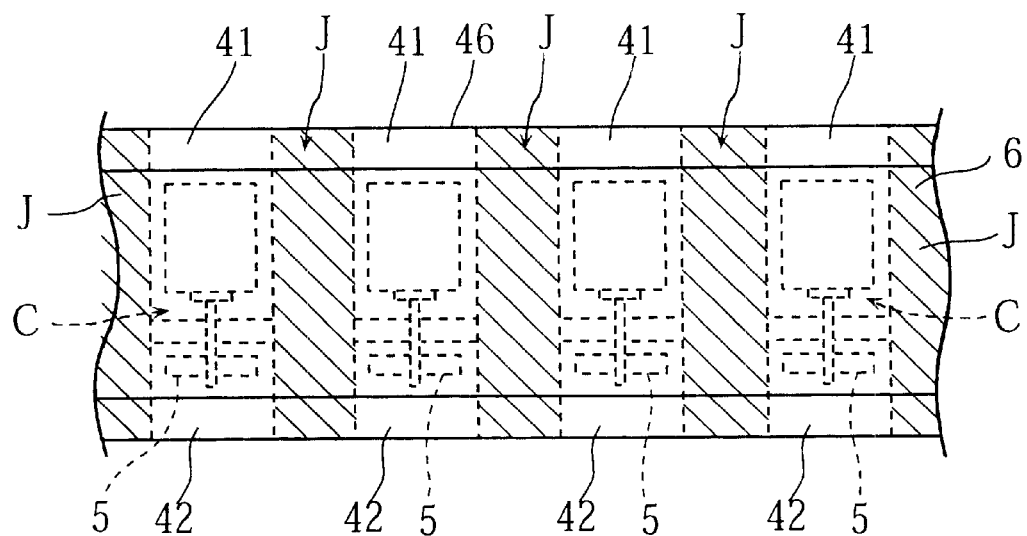
FIG. 28 illustrates a process step of a method for making the solid electrolytic capacitor of FIG. 22.

Subsequently, a resin package 6 is formed. Specifically, as shown in FIG. 27, the capacitor elements C, the conductive bolsters 5, and the band-like members 46 are enclosed from above and below by mold members 47, 48. Then, an epoxy resin in fluid state for example is injected into the cavity 49 for solidification. Thus, the band-like members 46, the capacitor elements C and the conductive bolsters 5 are integrally molded to provide an intermediate article. In this case, the resin package 6 is not formed at the terminal portions 41A, 42A on the reverse surface of the band-like members 46 so that the terminal portions are exposed to the outside.

Then, the molded intermediate article is divided into a plurality of solid electrolytic capacitors. Specifically, the intermediate article is cut vertically to remove the regions J indicated by hatching in FIG. 28, thereby providing a plurality of solid electrolytic capacitors 1D as shown in FIG. 22. Also with this method, a multiplicity of solid electrolytic capacitors 1E can be simultaneously formed by utilizing the material board 44. Therefore, the manufacturing cost can be reduced.

Figure 29:
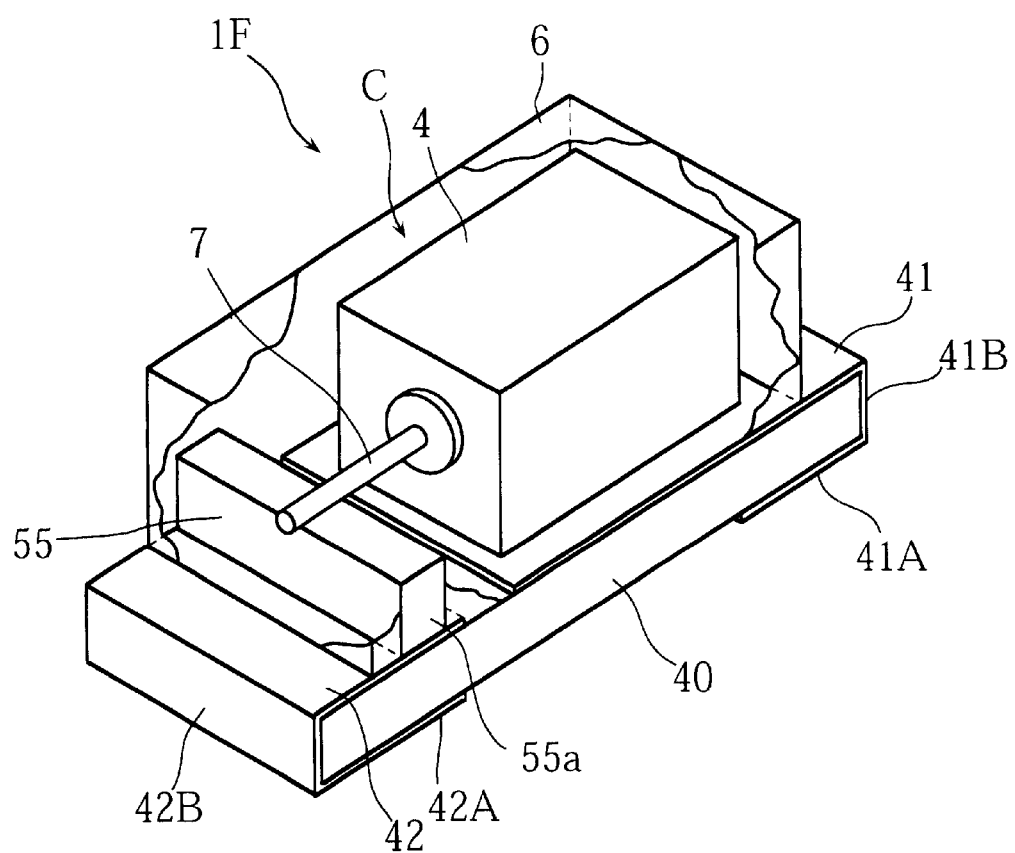
FIG. 29 is a perspective view, which is partially cut away, showing a solid electrolytic capacitor according to a seventh embodiment of the present invention.

FIG. 29 is a perspective view, which is partially cut away, showing a solid electrolytic capacitor according to a seventh embodiment of the present invention. In the illustrated solid electrolytic capacitor 1F, the conductive bolster 51 is elongated to expose its opposite end surfaces 55a to the outside. The structure of other parts is substantially the same as that of the sixth embodiment shown in FIG. 22. With this structure, it is possible to obtain the same advantages as those of the third embodiment shown in FIG. 19.

Figure 30:
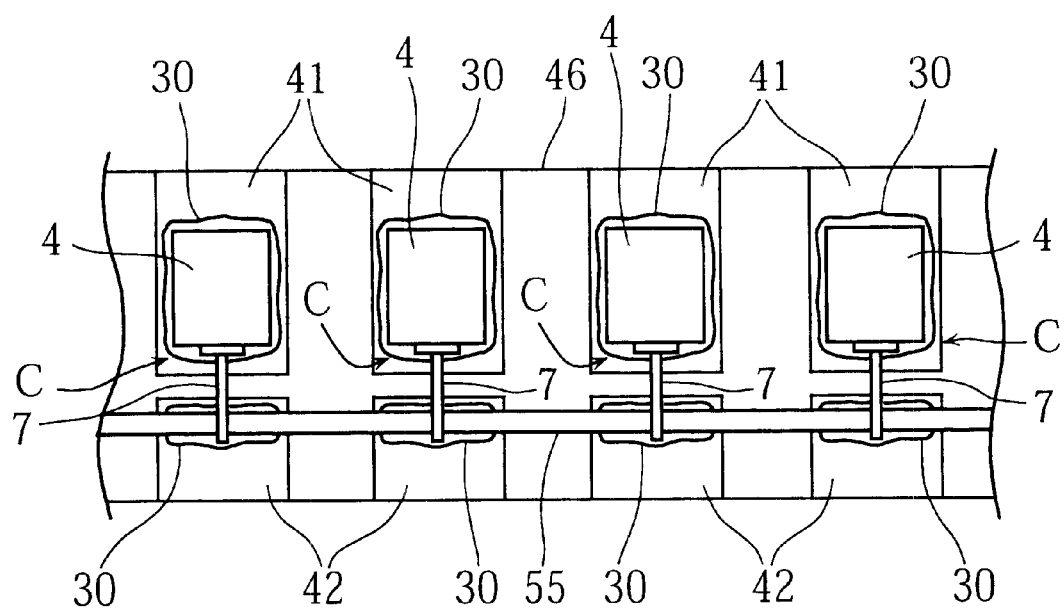
FIG. 30 illustrates a process step of a method for making the solid electrolytic capacitor of FIG. 29.

Although the solid electrolytic capacitor 1F can be formed generally in the same manner as the solid electrolytic capacitor 1E shown in FIGS. 23–28, it may be formed as follows. A bar-like conductive bolster 55 elongated to have a certain length is connected to capacitor elements C. As shown in FIG. 30, the conductive bolster bar 55 is connected to the anode pads 42 to bridge the anode pads 42. The element bodies 4 are connected to the cathode pads 41 via conductive adhesive 30.

Figure 31:
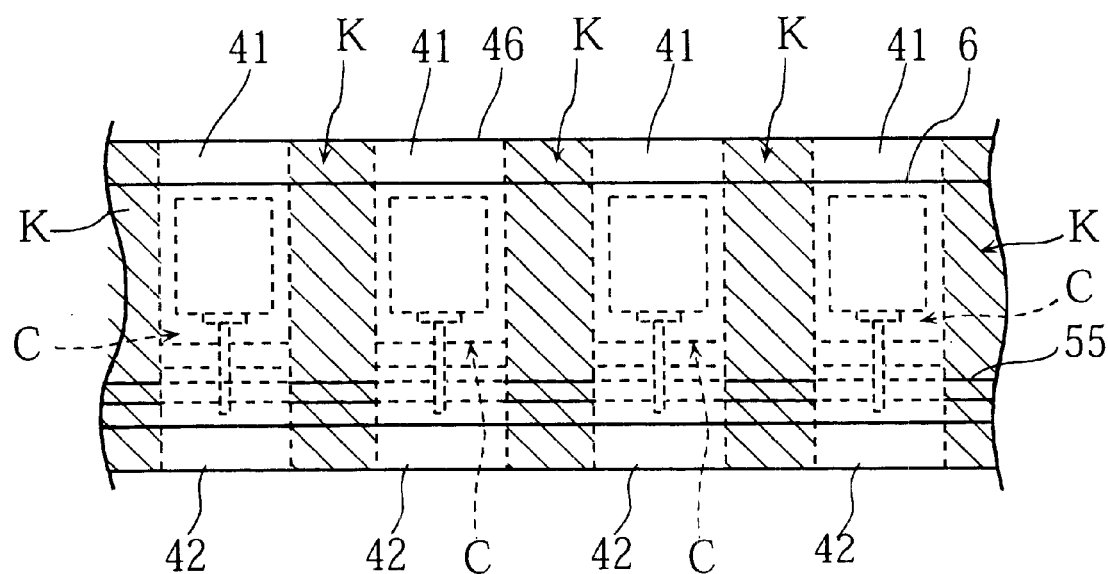
FIG. 31 illustrates a process step of a method for making the solid electrolytic capacitor of FIG. 29.

Thereafter, a resin package 6 is formed to cover the capacitor elements C. Then, the intermediate article thus prepared is cut together with the conductive bolster 55 to remove the regions K indicated by hatching in FIG. 31. Each of the resulting conductive bolsters 55 has opposite end surfaces 55a which are exposed to the outside at the cut surfaces of the resin package 6.

In another manufacturing method, the conductive bolster bar 55 may be connected to the anode pads 42 of the band-like member 46 before it is connected to the capacitor elements C. Thereafter, the anode wire 7 of each capacitor element C is connected to the upper surface 55a of the conductive bolster bar 55 by resistance welding.

In this way, the use of the bar-like conductive bolster 55 eliminates the need for individually connecting each conductive bolster 55 to a corresponding capacitor element C. Therefore, this method can shorten the manufacturing time and save the manufacturing work, which leads to enhancement of the manufacturing efficiency.

Figure 32:
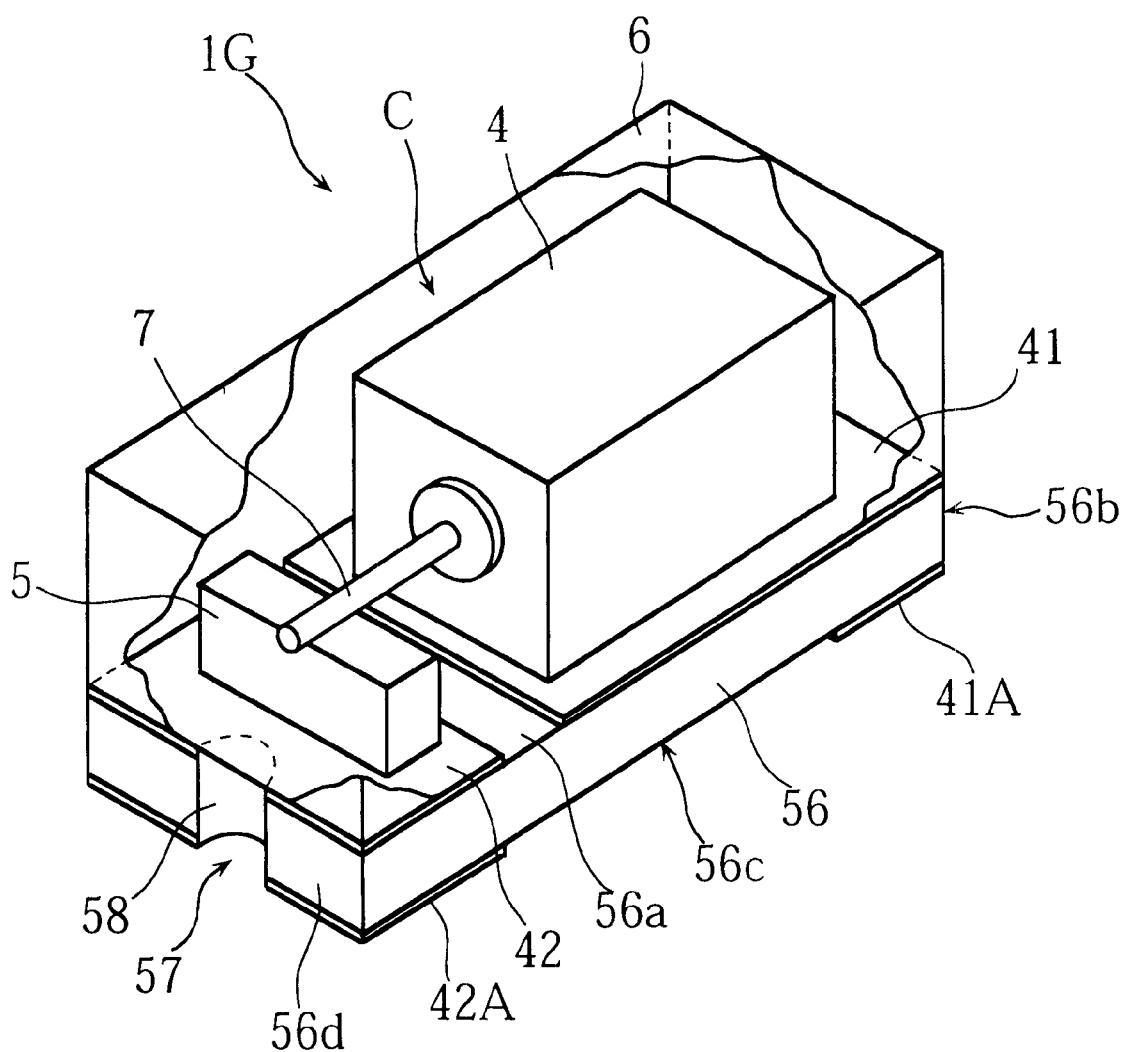
FIG. 32 is a perspective view, which is partially cut away, showing a solid electrolytic capacitor according to an eighth embodiment of the present invention.

FIG. 32 is a perspective view, which is partially cut away, showing a solid electrolytic capacitor according to an eighth embodiment of the present invention. In the illustrated solid electrolytic capacitor 1G, the substrate 56 has opposite end surfaces 56b, 56d each of which is formed with a groove 57 at its intermediate portion. (The groove formed at the end surface 56b is not illustrated.) The grooves 57 extend in the thickness direction of the substrate 56. The anode pad 42 is electrically connected to the terminal portion 42A formed on the lower surface 56c of the substrate 56 via the groove 57. The groove 57 has an inner surface provided with a conductive layer 58 formed by electroless plating for example. The conductive layer 58 may be made of copper for example. The conductive layer 58 is electrically connected to the anode pad 42 on the upper surface 56a of the substrate 56. The conductive layer 58 is also connected to the terminal portion 42A on the lower surface 56c of the substrate 56. The cathode pad 41 is electrically connected to the terminal portion 41A on the lower surface 56c of the substrate 56 via the non-illustrated groove on the side of the end surface 56b.

The resin package 6 is formed entirely over the upper surface 56a of the substrate 56. The structure of other portions is substantially the same as that of the seventh embodiment (See FIG. 29). With this structure, it is possible to obtain the same advantages as those obtained by the seventh embodiment.

Instead of the grooves 57, the substrate 56 may be formed with through-holes (not shown) penetrating the substrate 56 in the thickness direction. In this case, a conductive layer may be formed on the inner surfaces of the through-holes. The anode pad 42 (or the cathode pad 41) on the upper surface 56a and the terminal portion 42A (or the terminal portion 41A) on the lower surface 56c of the substrate 56 may be electrically connected to each other via the conductive layer.

The grooves 57 may be formed at the same time as forming the slits 45 by punching the material board 44 shown in FIG. 23. Alternatively, each groove may be made by forming a through-hole using a drill and then removing a half of the through-hole by punching.

Figure 33:
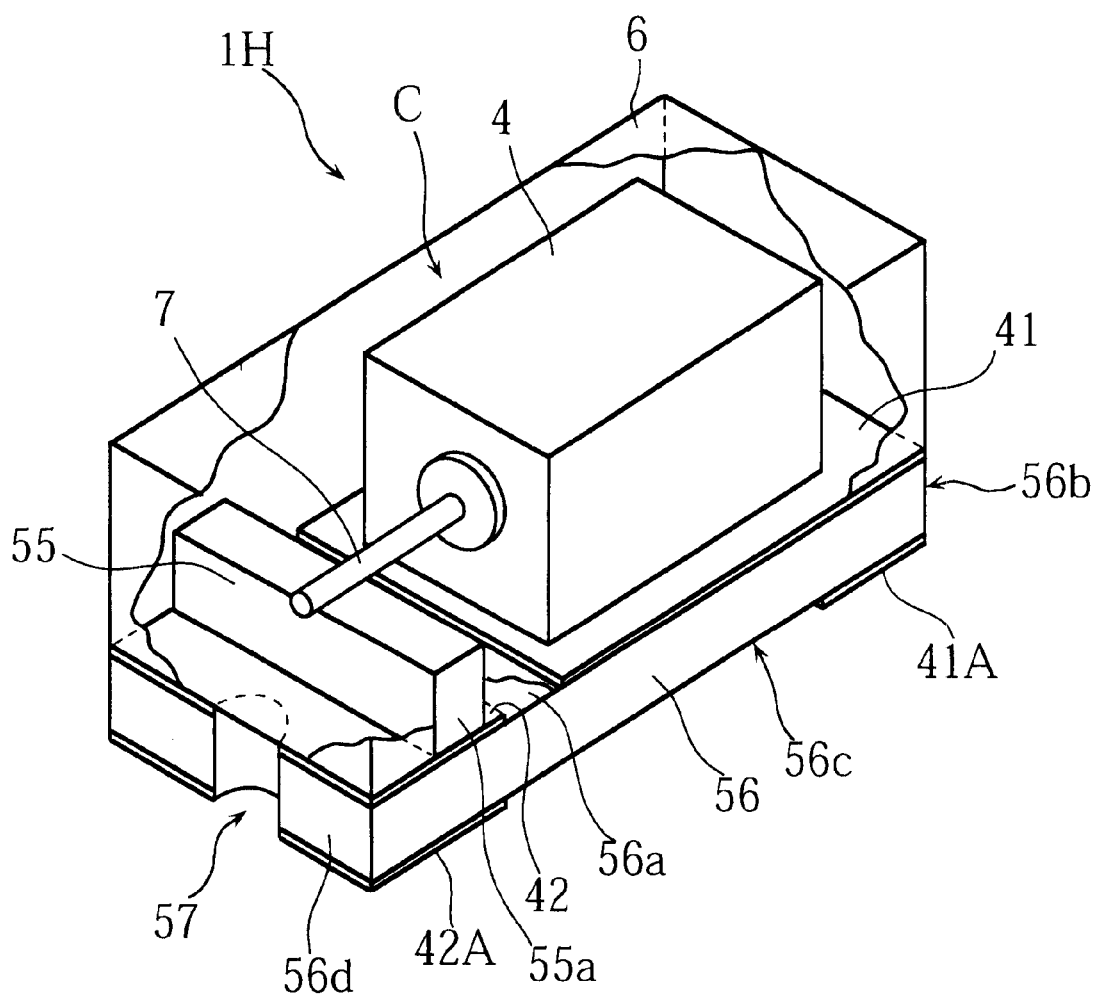
FIG. 33 is a perspective view, which is partially cut away, showing a solid electrolytic capacitor according to a ninth embodiment of the present invention.
Figure 34:
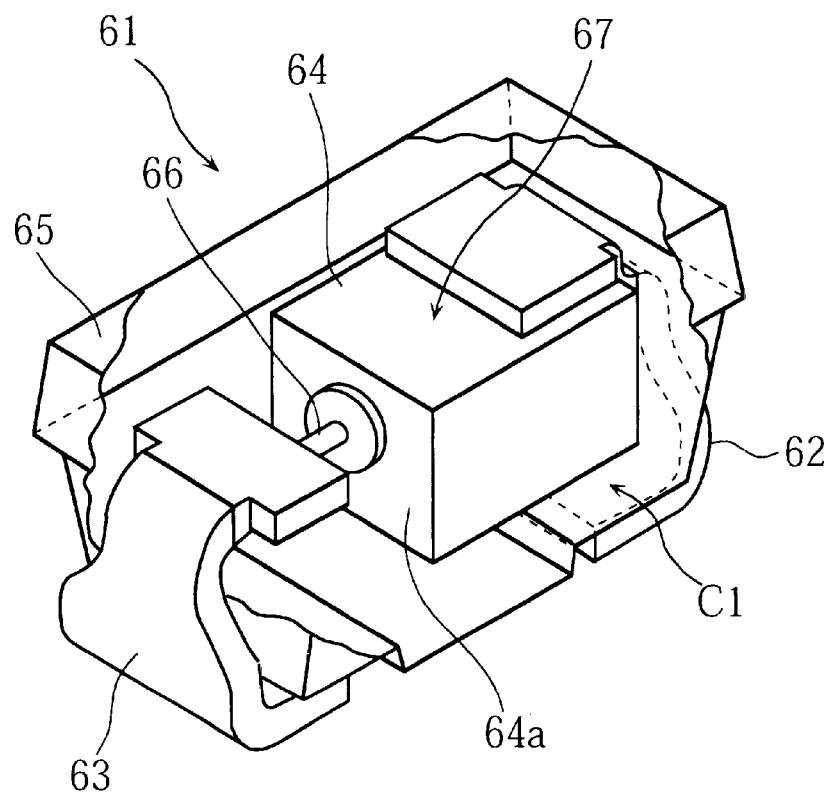
FIG. 34 is a perspective view, which is partially cut away, showing a prior art solid electrolytic capacitor.
Figure 35:
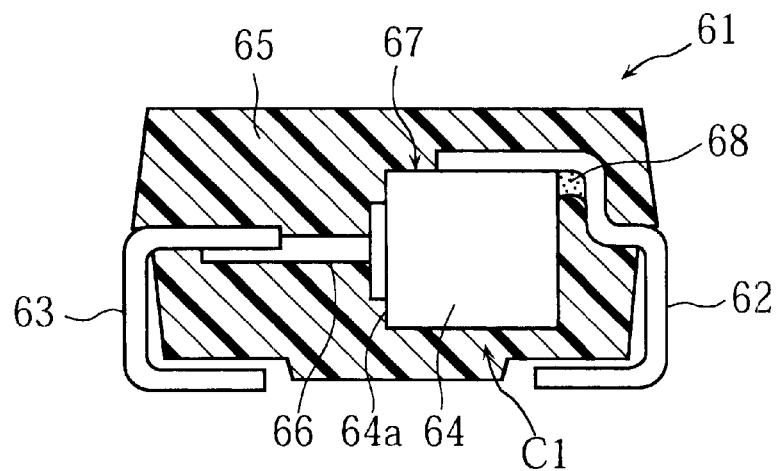
FIG. 35 is a see-through side view showing the solid electrolytic capacitor of FIG. 34.

FIG. 33 is a perspective view, which is partially cut away, showing a solid electrolytic capacitor according to a ninth embodiment of the present invention. In the illustrated solid electrolytic capacitor 1H, the conductive bolster 55 is elongated to expose its opposite end surfaces 55a to the outside. The structure of other parts is substantially the same as that of the eighth embodiment shown in FIG. 32. With this structure, it is possible to obtain the same advantages as those of the eighth embodiment.

What is claimed is:

1. A solid electrolytic capacitor comprising:

a capacitor element including an element body and a conductive wire extending therefrom;

a first electrode electrically connected to the element body;

a second electrode electrically connected to the conductive wire;

a conductive bolster bar; and a resin package integrally covering the capacitor element, the first electrode and the second electrode;

wherein each of the first electrode and the second electrode comprises a conductive plate having a lower surface exposed at a lower surface of the resin package for serving as a terminal surface, the first electrode having an upper surface to which the element body is connected, the first electrode supporting the element body without relying on an additional supporting member, the second electrode having an upper surface to which the conductive wire is connected via the conductive bolster bar, the second electrode being spaced away from the element body in a direction in which the conductive wire extends.

2. The solid electrolytic capacitor according to claim 1, wherein the lower surface of the first electrode is stepped, the upper surface being larger in area than the terminal surface.

3. The solid electrolytic capacitor according to claim 1, wherein the lower surface of the first electrode is partially etched to be stepped.

4. The solid electrolytic capacitor according to claim 1, wherein the upper surface of the second electrode has an edge formed with a stepped portion.

5. The solid electrolytic capacitor according to claim 4, wherein the stepped portion is formed by partially etching the upper surface of the second electrode.

6. The solid electrolytic capacitor according to claim 1, wherein the conductive bolster bar is in the form of a rectangular parallelepiped, at least one end surface of the conductive bolster bar being exposed at a side surface of the resin package.

7. The solid electrolytic capacitor according to claim 1, wherein the conductive wire is formed of tantalum;

the conductive bolster bar being formed of nickel or an alloy containing nickel;

these two members being connected to each other by resistance welding.

8. The solid electrolytic capacitor according to claim 1, wherein the element body is connected to the upper surface of the first electrode via a conducive adhesive;

the conductive bolster bar being connected to the upper surface of the second electrode with a conductive adhesive.

9. A solid electrolytic capacitor comprising:

a substrate including an upper surface framed with first and second electrodes, the substrate also including a lower surface formed with terminal surfaces electrically connected to the first and the second electrodes, respectively;

a capacitor element including an element body and a conductive wire extending therefrom;

a conductive bolster bar;

a resin package for sealing the capacitor element;

wherein the element body is connected to the first electrode of the substrate, the conductive wire being connected to the second electrode of the substrate via the bolster bar, the conductive wire extending from the element body and across the bolster bar to project beyond the bolster bar.

10. The solid electrolytic capacitor according to claim 9, wherein the conductive bolster bar is in the form of a rectangular parallelepiped, at least one end surface of the conductive bolster bar being exposed at a side surface of the resin package.

11. The solid electrolytic capacitor according to claim 9, wherein the conductive wire is formed of tantalum;

the conductive bolster bar being formed of nickel or an alloy containing nickel;

these two members being connected to each other by resistance welding.

12. The solid electrolytic capacitor according to claim 9, wherein the element body is connected to the upper surface of the first electrode via a conducive adhesive;

the conductive bolster bar being connected to the upper surface of the second electrode with a conductive adhesive.

* * * * *